US009723280B2

(12) United States Patent
Kobayashi et al.

(10) Patent No.: US 9,723,280 B2
(45) Date of Patent: Aug. 1, 2017

(54) PROJECTION TYPE IMAGE DISPLAY DEVICE, IMAGE PROCESSING DEVICE AND IMAGE PROCESSING METHOD, AND COMPUTER PROGRAM

(71) Applicant: SONY CORPORATION, Tokyo (JP)

(72) Inventors: Naoki Kobayashi, Tokyo (JP); Naomasa Takahashi, Chiba (JP); Yoichi Hirota, Kanagawa (JP); Yohsuke Kaji, Chiba (JP); Noriyuki Yamashita, Tokyo (JP); Masatoshi Nishino, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/760,042

(22) PCT Filed: Nov. 11, 2013

(86) PCT No.: PCT/JP2013/080378
§ 371 (c)(1),
(2) Date: Jul. 9, 2015

(87) PCT Pub. No.: WO2014/115400
PCT Pub. Date: Jul. 31, 2014

(65) Prior Publication Data
US 2015/0341607 A1    Nov. 26, 2015

(30) Foreign Application Priority Data
Jan. 22, 2013 (JP) .................................. 2013-009610

(51) Int. Cl.
*H04N 9/31* (2006.01)
*G02B 27/00* (2006.01)
(Continued)

(52) U.S. Cl.
CPC ....... *H04N 9/3182* (2013.01); *G02B 26/0833* (2013.01); *G02B 27/0025* (2013.01);
(Continued)

(58) Field of Classification Search
CPC ...... G03B 21/28; G03B 21/147; H04N 9/312; H04N 9/3129; H04N 9/3182; H04N 9/3185; G06T 5/006
See application file for complete search history.

(56) References Cited

U.S. PATENT DOCUMENTS

| 6,219,011 B1 * | 4/2001 | Aloni ...................... G06F 3/147 345/1.3 |
| 2003/0011751 A1 | 1/2003 | Sakata et al. |

(Continued)

FOREIGN PATENT DOCUMENTS

| JP | 09-084036 A | 3/1997 |
| JP | 2003-021800 A | 1/2003 |

(Continued)

*Primary Examiner* — Sultan Chowdhury
(74) *Attorney, Agent, or Firm* — Chip Law Group

(57) ABSTRACT

Provided is a projection-type image display device including: a projection unit including a light source configured to emit light having intensity corresponding to a pixel value of an input image and a deflection unit configured to deflect emitted light from the light source using a mirror to perform scanning on a projection object; a retiming unit configured to perform retiming on pixel data of the input image in accordance with a deflection angle in the deflection unit; a shape distortion correction table having a shape distortion correction amount in each shape distortion correction table calculation position; a brightness distortion correction table having a brightness distortion correction amount in each brightness distortion correction table calculation position; and an image correction unit configured to perform distortion correction on the input image by performing signal (Continued)

processing based on the shape distortion correction table and the brightness distortion correction table.

18 Claims, 18 Drawing Sheets

(51) Int. Cl.
  *G03B 21/14* (2006.01)
  *G02B 26/08* (2006.01)
  *G02B 26/10* (2006.01)

(52) U.S. Cl.
  CPC ....... *G02B 27/0031* (2013.01); *G03B 21/147* (2013.01); *H04N 9/312* (2013.01); *H04N 9/3129* (2013.01); *H04N 9/3185* (2013.01); *G02B 26/105* (2013.01)

(56) References Cited

U.S. PATENT DOCUMENTS

| | | | |
|---|---|---|---|
| 2004/0156024 A1* | 8/2004 | Matsuda | H04N 9/3194 353/70 |
| 2006/0203207 A1* | 9/2006 | Ikeda | G03B 21/14 353/70 |
| 2007/0171497 A1 | 7/2007 | Ishihara et al. | |
| 2009/0059096 A1* | 3/2009 | Yamamoto | G06T 5/006 348/746 |
| 2009/0244673 A1* | 10/2009 | Takemoto | G02B 13/0005 359/208.1 |
| 2012/0127184 A1 | 5/2012 | Satoh et al. | |

FOREIGN PATENT DOCUMENTS

| | | |
|---|---|---|
| JP | 2004-295029 A | 10/2004 |
| JP | 2007-199251 A | 8/2007 |
| JP | WO2009/035041 A | 3/2009 |
| JP | 2010-230730 A | 10/2010 |
| JP | 2012-124880 A | 6/2012 |

\* cited by examiner

SPACE IN WHICH NORMALIZATION HAS BEEN PERFORMED SO THAT STANDARD IMAGE POSITION AND INPUT IMAGE SPACE CORRESPOND TO EACH OTHER

SHAPE DISTORTION CORRECTION AMOUNT

REFERENCE PIXEL POSITION 1002

TABLE POSITION OF INPUT IMAGE 1001

INPUT IMAGE SPACE [pixel]

MIRROR ANGLE SPACE [deg]

GAUSSIAN DISTRIBUTION
IN WHICH BEAM DIAMETER DEVIATES
IN HORIZONTAL AND
VERTICAL DIRECTIONS

GAUSSIAN DISTRIBUTION OF σ = 1.0

DISTANCE d BETWEEN BEAMS

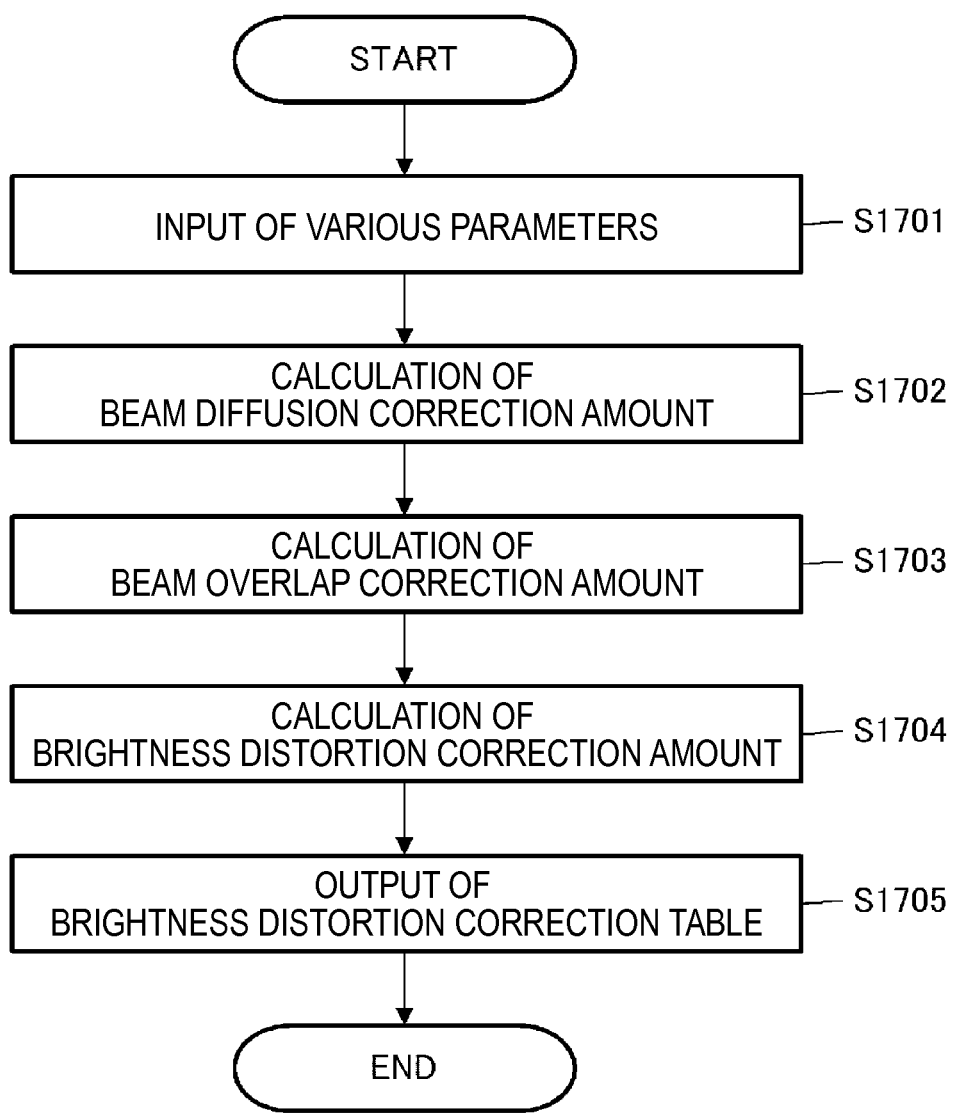

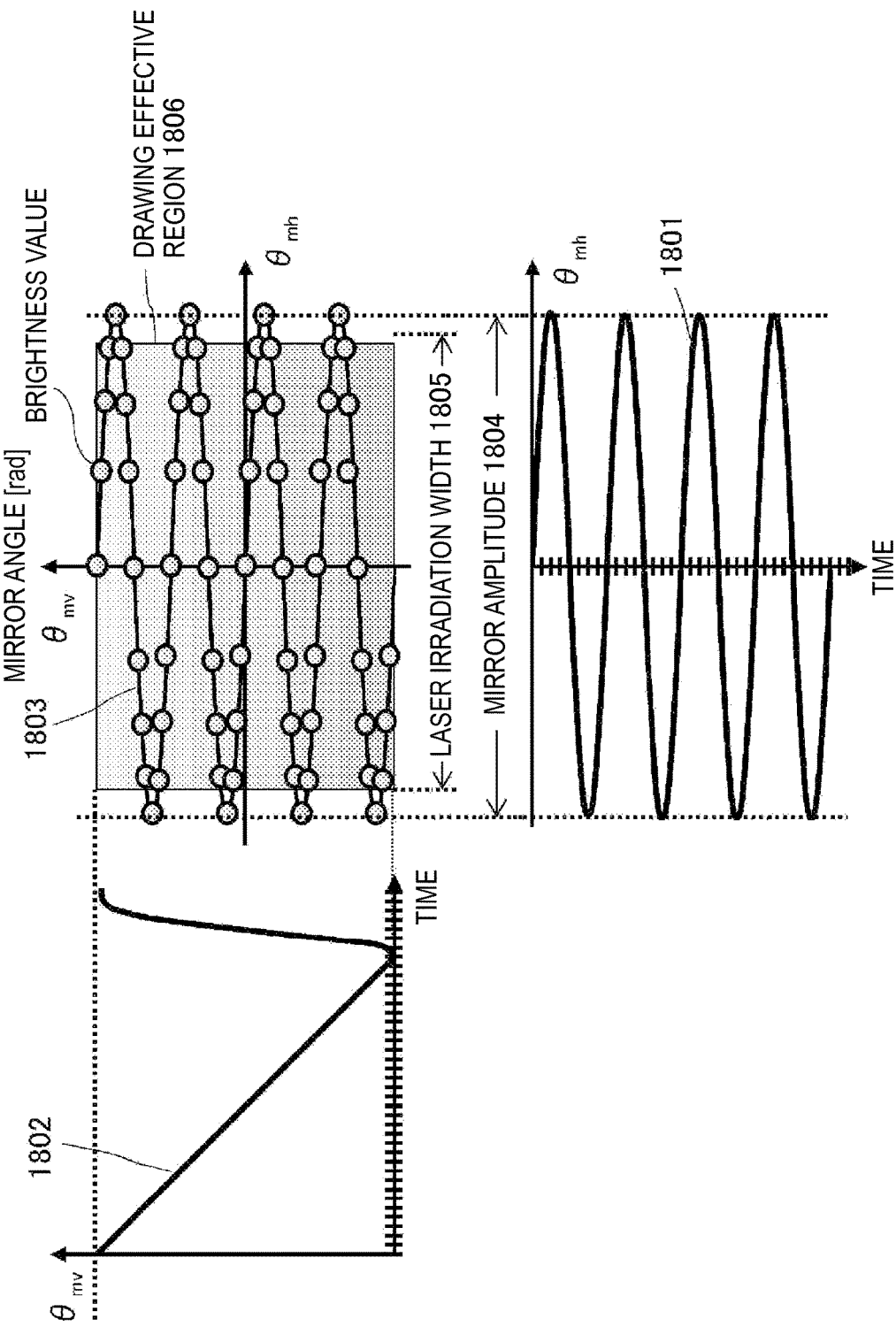

PROJECTION TYPE IMAGE DISPLAY DEVICE, IMAGE PROCESSING DEVICE AND IMAGE PROCESSING METHOD, AND COMPUTER PROGRAM

TECHNICAL FIELD

A technology disclosed in the present specification relates to a projection-type image display device that projects and displays reproduced video images of media or a computer screen on a projection object such as a screen, an image processing device and an image processing method, and a computer program, and particularly relates to a projection-type image display device including a light source such as a laser and a deflection unit that deflects irradiation light thereof to perform scanning on the projection object, an image processing device and an image processing method, and a computer program.

BACKGROUND ART

Recently, there have been more occasions in which video images received by a television, video images reproduced from media such as a Blu-ray Disc, and personal computer (PC) screens, for example, are projected on a large-sized screen using a projection-type image display device so that a plurality of persons view them or make presentations. In addition, there also exists a small-sized projection-type image display device (pico-projector) that is used on a palm or mounted on a mobile device.

In addition, there is also developed a projection-type image display device including a laser or a light emitting diode (LED) as a light source and having high color saturation and satisfactory color reproducibility. By deflecting irradiation light from the light source with the use of, for example, a micro electro mechanical systems (MEMS) mirror to perform dimensional scanning on a screen, it is possible to display an image by a residual effect thereof.

For example, there is proposed an image projection device that includes a dimensional scanning unit formed by combining a mirror that performs scanning in a horizontal direction with a mirror that performs scanning in a vertical direction and synchronizes horizontal scanning and vertical scanning of light beams to form a projection image on a screen (see, for example, Patent Literature 1).

In a case where an image is projected, it is problematic in that the image is deflected to have a trapezoid shape because the image is obliquely projected on a projection object (screen wall surface or the like). For example, there are proposed a method of correcting trapezoid distortion by controlling an amplitude of an oscillating mirror depending on a position of a vertical axis (see, for example, Patent Literature 2) and a method of correcting trapezoid, without reducing an effective pixel, by controlling a timing at which an oscillating mirror is irradiated with laser beams to make fine adjustments to a pixel position (see, for example, Patent Literature 3). There is also proposed a method of correcting distortion generated at the time of oblique projection by, in a case where an irradiation center direction of laser beams and an irradiation surface have a projection angle which is not right angle, storing, in advance, coefficient information on a polynomial expression for obtaining an irradiation position of laser beams on the basis of an angle of a reflective optical element, applying a coefficient obtained by calculating the coefficient information and the angle of the reflective optical element to the polynomial expression to calculate an irradiation position of laser beams, reading pixel information corresponding to the irradiation position from a frame memory, and oscillating a laser oscillator at brightness corresponding to the pixel information (see, for example, Patent Literature 4).

However, in a projection-type image display device including a light source such as a laser and a deflection mirror device that performs dimensional scanning on a screen with laser beams, there are shape distortion caused by not vertically irradiating a MEMS mirror with laser beams and brightness distortion caused by sparsity and density of output points of lasers and an irradiation angle onto the screen.

CITATION LIST

Patent Literature

Patent Literature 1: JP 2003-21800A
Patent Literature 2: JP 2007-199251A
Patent Literature 3: JP 2004-295029A
Patent Literature 4: JP 2012-124880A

SUMMARY OF INVENTION

Technical Problem

An object of the technology disclosed in the present specification is to provide an excellent projection-type image display device capable of automatically correct distortion generated in an image projected on a screen, an image processing device and an image processing method that generate a distortion correction amount, and a computer program.

A further object of the technology disclosed in the present specification is to provide an excellent projection-type image display device that includes a light source such as a laser and a deflection unit that deflects irradiation light thereof to perform scanning on a projection object and is capable of automatically correcting shape distortion and brightness distortion generated in a projection image, an excellent image processing device and an excellent image processing method that are capable of automatically generating correction amounts of the shape distortion and the brightness distortion, and a computer program.

Solution to Problem

The present application has been made in consideration of the above objects. According to a technology disclosed in claim 1, there is provided a projection-type image display device including: a projection unit including a light source configured to emit light having intensity corresponding to a pixel value of an input image and a deflection unit configured to deflect emitted light from the light source using a mirror to perform scanning on a projection object; a retiming unit configured to perform retiming on pixel data of the input image in accordance with a deflection angle in the deflection unit; a shape distortion correction table having a shape distortion correction amount in each shape distortion correction table calculation position, the shape distortion correction table being for correcting shape distortion included in a projection image on the projection object from the projection unit; a brightness distortion correction table having a brightness distortion correction amount in each brightness distortion correction table calculation position, the brightness distortion correction table being for correcting brightness distortion included in the projection image; and an image correction unit configured to perform distortion correction on the input image by performing signal processing based on the shape distortion correction table and the brightness distortion correction table.

According to a technology disclosed in claim 1, the projection-type image display device according to claim 1 further includes a correction table calculation unit configured to calculate the shape distortion correction table and the brightness distortion correction table.

According to a technology disclosed in claim 1, the correction table calculation unit of the projection-type image display device according to claim 1 calculates the shape distortion correction amount in each shape distortion correction table calculation position on the basis of an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

According to a technology disclosed in claim 2, the correction table calculation unit of the projection-type image display device according to claim 1 generates mirror angle information corresponding to an outer circumference portion of the input image on the basis of the input image parameter and the mirror-parameter, performs ray tracing on an emission direction of light emitted from the light source in the outer circumference portion of the input image on the basis of the mirror-model, calculates a region on the projection object, the region corresponding to the outer circumference portion of the input image, on the basis of the projection object parameter, and calculates a standard image position including a region that is inscribed with the region corresponding to the outer circumference portion and has a same aspect ratio as the input image, generates mirror angle information corresponding to each shape distortion correction table calculation position on the basis of the input image parameter and the mirror-parameter, performs ray tracing on an emission direction of light emitted from the light source in each shape distortion correction table calculation position on the basis of the mirror-model, and calculates a position on the projection object, the position corresponding to each shape distortion correction table calculation position, on the basis of the projection object parameter, and normalizes the position on the projection object, the position corresponding to each shape distortion correction table calculation position, on the basis of the standard image position to obtain the shape distortion correction amount in each shape distortion correction table calculation position.

According to a technology disclosed in claim 3, the correction table calculation unit of the projection-type image display device according to claim 1 calculates the brightness distortion correction table for correcting beam diffusion brightness distortion caused by a difference of beam diffusion of emitted light in each place in a drawing effective region of the projection object and beam overlap brightness distortion caused by an overlap degree of beams of emitted light in each place in the drawing effective region of the projection object.

According to a technology disclosed in claim 4, the correction table calculation unit of the projection-type image display device according to claim 3 calculates the brightness distortion correction table for correcting the beam diffusion brightness distortion and the beam overlap brightness distortion on the basis of an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

According to a technology disclosed in claim 5, the correction table calculation unit of the projection-type image display device according to claim 3 multiplies together the beam diffusion brightness distortion and the beam overlap brightness distortion obtained in each brightness distortion correction table calculation position to normalize a multiplied distortion and sets the multiplied distortion as a brightness distortion correction amount in the position.

According to a technology disclosed in claim 6, the correction table calculation unit of the projection-type image display device according to claim 4 generates mirror angle information corresponding to each brightness distortion correction table calculation position on the basis of the input image parameter and the mirror-parameter, performs ray tracing on an emission direction of light emitted from the light source and an extent of beams in each brightness distortion correction table position on the basis of the mirror-model, calculates a position and the extent of the beams on the projection object, the position and the extent of the beams corresponding to each brightness distortion correction table calculation position, on the basis of the projection object parameter, calculates an extent degree of the beams in each brightness distortion correction table calculation position on the basis of the extent of the beams, and calculates a beam diffusion brightness distortion correction amount for reducing beam brightness in each brightness distortion correction table calculation position on the basis of the extent degree of the beams.

According to a technology disclosed in claim 7, the correction table calculation unit of the projection-type image display device according to claim 6 calculates the beam diffusion brightness distortion correction amount by calculating the extent degree of the beams in each brightness distortion correction table calculation position as an area s of a 3σ region on the projection object and normalizing the area s on the basis of a predetermined extent degree $s_{max}$.

According to a technology disclosed in claim 8, the correction table calculation unit of the projection-type image display device according to claim 4 calculates mirror angles in retiming positions in a vicinity of a mirror angle corresponding to each brightness distortion correction table calculation position on the basis of the mirror-parameter, performs ray tracing on emission directions of light emitted from the light source and extent degrees of beams corresponding to the mirror angles in the retiming positions in the vicinity of the mirror angle on the basis of the mirror-model, calculates a relative overlap degree of the beams in the retiming positions in the vicinity of the mirror angle on the basis of the emission directions of the light emitted from the light source and the extent degrees of the beams, and obtains, on the basis of the overlap degree, a beam overlap correction amount for reducing brightness in a part that becomes bright due to high density of output points of light in each brightness distortion correction table calculation position.

According to a technology disclosed in claim 9, the correction table calculation unit of the projection-type image display device according to claim 8 normalizes the extent degree of the beams in each of the retiming positions in a periphery of the brightness distortion table calculation position in a manner that the beams have Gaussian distribution of $\sigma=1$ and then overlaps the beams to calculate the overlap degree, performs normalization in a manner that a maximum overlap rate becomes 1 to obtain an overlap rate of the beams, and obtains a beam overlap brightness distortion correction amount corresponding to an overlap rate p2 in a predetermined distance d from a beam center.

According to a technology disclosed in claim 10, there is provided an image processing device including: a projection unit configured to project an input image on an object and a parameter input unit configured to input a parameter regarding the input image; a shape distortion correction table calculation unit configured to calculate, on the basis of the parameter, a shape distortion correction table for correcting shape distortion included in a projection image on the projection object from the projection unit; and a brightness distortion correction table calculation unit configured to calculate, on the basis of the parameter, a brightness distortion correction table for correcting brightness distortion included in the projection image.

According to a technology disclosed in claim 11, the projection unit includes a light source configured to emit light having intensity corresponding to a pixel value of the input image and a deflection unit configured to deflect emitted light from the light source using a mirror to perform scanning on a projection object, and performs retiming on pixel data of the input image in accordance with a deflection angle in the deflection unit to perform irradiation. The parameter input unit of the image processing device according to claim 10 inputs an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

According to a technology disclosed in claim 12, the shape distortion correction table calculation unit of the image processing device according to claim 11 generates mirror angle information corresponding to an outer circumference portion of the input image on the basis of the input image parameter and the mirror-parameter, performs ray tracing on an emission direction of light emitted from the light source in the outer circumference portion of the input image on the basis of the mirror-model, calculates a region on the projection object, the region corresponding to the outer circumference portion of the input image, on the basis of the projection object parameter, and calculates a standard image position including a region that is inscribed with the region corresponding to the outer circumference portion and has a same aspect ratio as the input image, generates mirror angle information corresponding to each shape distortion correction table calculation position of the shape distortion correction table on the basis of the input image parameter and the mirror-parameter, performs ray tracing on an emission direction of light emitted from the light source in each shape distortion correction table calculation position on the basis of the mirror-model, and calculates a position on the projection object, the position corresponding to each shape distortion correction table calculation position, on the basis of the projection object parameter, and normalizes the position on the projection object, the position corresponding to each shape distortion correction table calculation position, on the basis of the standard image position to obtain the shape distortion correction amount in each shape distortion correction table calculation position.

According to a technology disclosed in claim 13, the brightness distortion correction table calculation unit of the image processing device according to claim 11 calculates the brightness distortion correction table for correcting beam diffusion brightness distortion caused by a difference of beam diffusion of emitted light in each place in a drawing effective region of the projection object and beam overlap brightness distortion caused by an overlap degree of beams of emitted light in each place in the drawing effective region of the projection object.

According to a technology disclosed in claim 14, the brightness distortion correction table calculation unit of the image processing device according to claim 13 multiplies together the beam diffusion brightness distortion and the beam overlap brightness distortion obtained in each brightness distortion correction table calculation position to normalize a multiplied distortion and sets the multiplied distortion as a brightness distortion correction amount in the position.

According to a technology disclosed in claim 15, the brightness distortion correction table calculation unit of the image processing device according to claim 13 generates mirror angle information corresponding to each brightness distortion correction table calculation position on the basis of the input image parameter and the mirror-parameter, performs ray tracing on an emission direction of light emitted from the light source and an extent of beams in each brightness distortion correction table position on the basis of the mirror-model, calculates a position and the extent of the beams on the projection object, the position and the extent of the beams corresponding to each brightness distortion correction table calculation position, on the basis of the projection object parameter, calculates an extent degree of the beams in each brightness distortion correction table calculation position on the basis of the extent of the beams, and calculates a beam diffusion brightness distortion correction amount for reducing beam brightness in each brightness distortion correction table calculation position on the basis of the extent degree of the beams.

According to a technology disclosed in claim 16, the brightness distortion correction table calculation unit of the image processing device according to claim 3 calculates mirror angles in retiming positions in a vicinity of a mirror angle corresponding to each brightness distortion correction table calculation position on the basis of the mirror-parameter, performs ray tracing on emission directions of light emitted from the light source and extent degrees of beams corresponding to the mirror angles in the retiming positions in the vicinity of the mirror angle on the basis of the mirror-model, calculates a relative overlap degree of the beams in the retiming positions in the vicinity of the mirror angle on the basis of the emission directions of the light emitted from the light source and the extent degrees of the beams, and obtains, on the basis of the overlap degree, a beam overlap correction amount for reducing brightness in a part that becomes bright due to high density of output points of light in each brightness distortion correction table calculation position.

According to a technology disclosed in claim 17, there is provided an image processing method including: a parameter input step of inputting a projection unit configured to project an input image on an object and a parameter regarding the input image; a shape distortion correction table calculation step of calculating, on the basis of the parameter, a shape distortion correction table for correcting shape distortion included in a projection image on the projection object from the projection unit; and a brightness distortion correction table calculation step of calculating, on the basis of the parameter, a brightness distortion correction table for correcting brightness distortion included in the projection image.

According to a technology disclosed in claim 18, there is provided a computer program described in computer-readable consciousness, the computer program causing a computer to function as: a projection unit configured to project an input image on an object and a parameter input unit configured to input a parameter regarding the input image; a shape distortion correction table calculation unit configured to calculate, on the basis of the parameter, a shape distortion correction table for correcting shape distortion included in a projection image on the projection object from the projection unit; and a brightness distortion correction table calculation unit configured to calculate, on the basis of the parameter, a brightness distortion correction table for correcting brightness distortion included in the projection image.

The computer program according to claim 18 of the present application defines a computer program described in a computer-readable form so as to realize predetermined processing in a computer. In other words, by installing the computer program according to claim 18 of the present application in a computer, a cooperative action is exerted in the computer, and therefore it is possible to obtain an effect similar to that of the image processing device according to claim 10 of the present application.

Advantageous Effects of Invention

According to the technology disclosed in the present specification, it is possible to provide an excellent projection-type image display device that includes a light source such as a laser and a deflection unit that deflects irradiation light thereof to perform scanning on a projection object and is capable of automatically correcting shape distortion and brightness distortion generated in a projection image, an excellent image processing device and an excellent image processing method that are capable of automatically generating correction amounts of the shape distortion and the brightness distortion, and a computer program.

The projection-type image display device to which the technology disclosed in the present specification is applied can automatically generate a shape distortion correction table for correcting shape distortion caused by not vertically irradiating a MEMS mirror with laser beams and a brightness distortion correction table for correcting brightness distortion caused by sparsity and density of output points of lasers and an irradiation angle onto a screen and can correct, on the basis of the distortion correction tables, the shape distortion and the brightness distortion generated in the projection image.

Therefore, the projection-type image display device to which the technology disclosed in the present specification is applied can improve an image quality by correcting both distortion of a shape and deviation of brightness distribution of a projection image that is formed on the screen by performing dimensional scanning with laser beams with the use of the MEMS mirror or the like.

In addition, the projection-type image display device to which the technology disclosed in the present specification is applied can project an image having no shape distortion and no brightness distortion on the screen even in a case where a projection unit does not face the screen.

In addition, according to the technology disclosed in the present specification, the projection-type image display device outputs distortion correction information on shape distortion and brightness distortion of a projection image as a table, and therefore it is possible to reduce a size of a memory for holding information for correction.

In addition, according to the technology disclosed in the present specification, the projection-type image display device performs distortion correction regarding shape distortion and brightness distortion by performing signal processing on an image projected from the projection unit. Therefore, an optical system such as a lens for distortion correction is not needed, so that a cost of the device is not increased.

Other intentions, features, and advantages of the technology disclosed in the present specification will become clear by the following detail description based on the later-described embodiment and appended drawings.

BRIEF DESCRIPTION OF DRAWINGS

FIG. 17 is a flowchart illustrating a processing procedure for calculating a brightness distortion correction table.

FIG. 18 is a diagram for describing retiming processing.

DESCRIPTION OF EMBODIMENTS

Hereinafter, embodiments of the technology disclosed in the present specification will be described in detail with reference to the appended drawings.

A. Device Configuration

Figure 1:
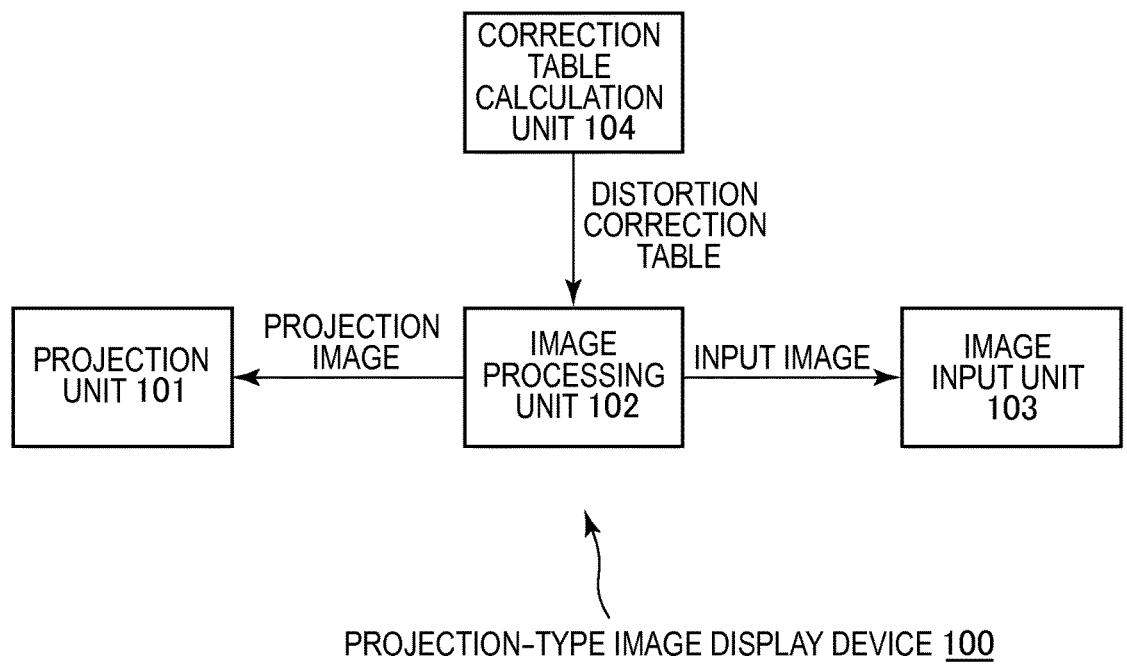
FIG. 1 is a diagram schematically illustrating a configuration of a projection-type image display device 100 according to an embodiment of the technology disclosed in the present specification.

FIG. 1 schematically illustrates a configuration of a projection-type image display device 100 according to an embodiment of the technology disclosed in the present specification. The projection-type image display device 100 illustrated in FIG. 1 includes a projection unit 101, an image processing unit 102, an image input unit 103, and a correction table calculation unit 104. Hereinafter, each unit will be described.

The projection unit 101 includes a light source for emitting laser beams and a deflection unit, such as MEMS mirrors, which deflects the laser beams emitted from the light source to perform dimensional scanning on a projection object such as a screen (not illustrated in FIG. 1) (described below).

The image input unit 103 inputs an image signal from a projection image supply source such as a personal computer, a television (TV) receiver, and a Blu-ray Disc reproducing device (any of them is not illustrated).

Note that an input image parameter including a size of a projection image (hereinafter, "input image size") inputted to the image input unit 103 is information needed when a shape distortion correction table and a brightness distortion correction table are calculated in the correction table calculation unit 104 (described below). For example, when the image input unit 103 analyzes an input image to acquire a necessary input image parameter, the image input unit 103 may supply the necessary input image parameter to the correction table calculation unit 104.

The image processing unit 102 processes an image to be projected and outputted from the projection unit 101. The image inputted to the image processing unit 102 is an external image supplied from an external supply source via the image input unit 103.

For example, free-scanning is performed with laser beams emitted from the projection unit 101. However, a scanning line thereof is not a straight line, and an output point of laser beams does not correspond to one pixel of an input image which is assumed to be square pixels. Therefore, the image processing unit 102 performs processing for resampling input pixel data which is assumed to be the square pixels to a deflection angle in a deflection unit (described below) and intensity of laser beams corresponding thereto, i.e., performs "retiming".

The image processing unit 102 performs distortion correction on the external image supplied from the image input unit 103 on the basis of the distortion correction tables calculated by the correction table calculation unit 104. Distortion to be subjected to image correction includes shape distortion caused by not vertically irradiating the MEMS mirrors with laser beams emitted from the light source and brightness distortion caused by sparsity and density of output points of laser beams and an irradiation angle onto the screen.

The correction table calculation unit 104 calculates the shape distortion correction table for correcting shape distortion included in the image projected in the projection unit 101 and the brightness distortion correction table for correcting brightness distortion. The shape distortion correction table has shape distortion correction amounts in respective discrete shape distortion correction table calculation positions on an input image space. In addition, the brightness distortion correction table has brightness distortion correction amounts in respective discrete brightness distortion correction table calculation positions on the input image space.

The shape distortion correction table and the brightness distortion correction table calculated by the correction table calculation unit 104 are held in an internal memory of any one of the correction table calculation unit 104 and the image processing unit 102 or a dedicated table-memory (any of them is not illustrated). Then, in a case where the input image from the image input unit 103 is subjected to, for example, retiming, the image processing unit 102 performs correction processing on the basis of the shape distortion correction table and the brightness distortion correction table. After the above distortion correction is performed, an image whose shape distortion and brightness distortion have been cancelled is irradiated from the projection unit 101.

Figure 2:
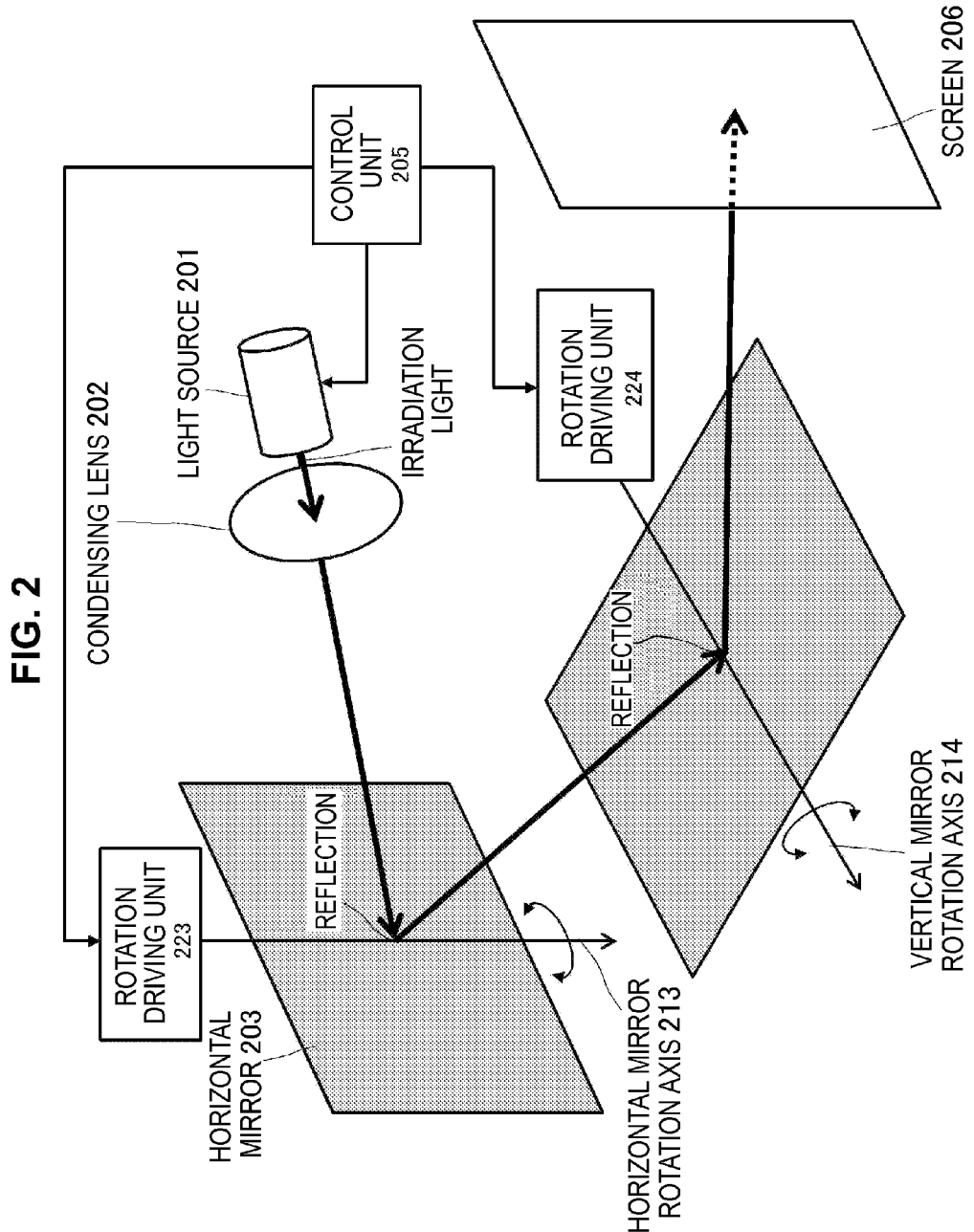
FIG. 2 is a diagram illustrating an inner configuration example of a projection unit 101.

FIG. 2 illustrates an inner configuration example of the projection unit 101. The projection unit 101 illustrated in FIG. 2 includes: a light source 201 that emits laser beams; a condensing lens 202 that condenses the laser beams emitted from the light source 201; a deflection unit including a horizontal mirror 203 that performs scanning with the condensed laser beams in a horizontal direction and a vertical mirror 204 that performs scanning with the condensed laser beams in a vertical direction; rotation driving units 223 and 224 that drive the light source 201 and rotatably drive the horizontal mirror 203 and the vertical mirror 204 around a horizontal mirror axis 213 and a vertical mirror axis 214, respectively; and a control unit 205 that controls irradiation with laser beams emitted from the light source 201 and the rotation driving units 223 and 224. Although not illustrated in FIG. 2, the light source 201 includes a laser oscillator that overlaps irradiation light emitted from laser diodes of RGB colors and outputs the overlapped irradiation light. The horizontal mirror 203 and the vertical mirror 204 include, for example, MEMS mirrors.

The control unit 205 performs free-scanning on a screen 206 serving as a projection object with laser beams emitted from the light source 201. Specifically, scanning with laser beams in the vertical direction by the vertical mirror 204 is performed in synchronism with reciprocal scanning with laser beams in the horizontal direction by the horizontal mirror 203, and the light source 201 intermittently (in a predetermined short period) emits laser beams at brightness corresponding to pixel information. A scanning line of the laser beams is not a straight line. In addition, one pixel of an original image and an output point of laser beams do not correspond to each other. In addition, density of output points of laser beams is sparse and dense depending on an irradiation position (mirror angle).

Note that a "mirror-parameter" including mirror deflection angles of the horizontal mirror 203 and the vertical mirror 204, effective beam region information, and mirror angle information at the time of retiming, and a "mirror-model" including mirror positions of the horizontal mirror 203 and the vertical mirror 204, mirror rotation axes thereof, and optical arrangement information of the light source 101, are information needed when the shape distortion correction table and the brightness distortion correction table are calculated in the correction table calculation unit 104 (described below). In this embodiment, the correction table calculation unit 104 has means (for example, notified by the control unit 205) capable of acquiring information on the mirror-parameter and the mirror-model.

A "screen-parameter" including position information of the screen 206 serving as a projection object relative to the projection unit 101 is also information needed when the shape distortion correction table and the brightness distortion correction table are calculated in the correction table calculation unit 104 (described below). In this embodiment, the correction table calculation unit 104 has means capable of acquiring the screen-parameter.

Figure 3:
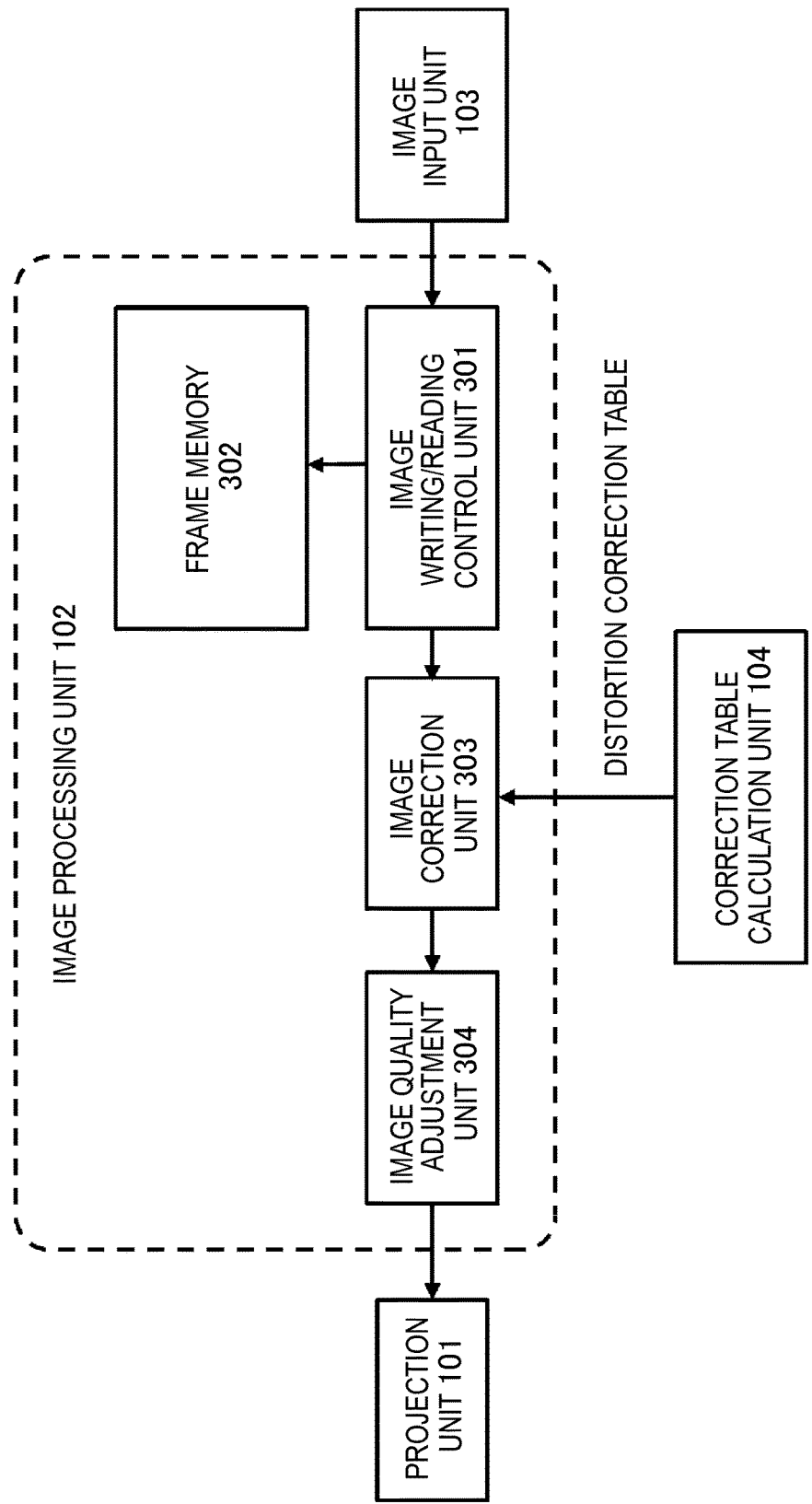
FIG. 3 is a diagram illustrating an inner configuration example of an image processing unit 102.

FIG. 3 illustrates an inner configuration example of the image processing unit 102. The image processing unit 102 illustrated in FIG. 3 includes an image writing/reading control unit 301, a frame memory 302, an image correction unit 303, and an image quality adjustment unit 304.

The frame memory 302 stores images supplied from the image input unit 103. The image writing/reading control unit 301 controls writing and reading of image frames relative to the frame memory 302.

The image correction unit 303 performs retiming on an image read from the frame memory 302, i.e., resamples pixel data which is assumed to be square pixels to the angles of the horizontal mirror 203 and the vertical mirror 204 and intensity of laser beams corresponding thereto.

Further, the image correction unit 303 performs, on the basis of a distortion correction table including the shape distortion correction table and the brightness distortion correction table calculated in the correction table calculation unit 104, distortion correction on the pixel data after retiming so that shape distortion and brightness distortion generated when projection is performed from the projection unit 101 to an object are cancelled. Specifically, the image correction unit 303 obtains a reference pixel position in an original image by interpolation and uses the shape distortion correction table in order to determine intensity of laser beams emitted from the projection unit 101 at the time of retiming. By the shape distortion correction, distortion derived from the horizontal mirror 203 and the vertical mirror 204 and shape distortion of an image on the screen, which is generated by not facing the screen, are corrected. In addition, the image correction unit 303 uses the brightness distortion correction table in order to determine a gain of intensity of laser beams emitted by the projection unit 101 at the time of retiming by interpolation. By the brightness distortion correction, brightness distortion caused by a difference of density of emission points of laser beams (i.e., variation of beam overlap amounts in respective places) and distortion of brightness distribution of the image on the screen, which is generated by diffusion of light beams, are corrected.

The image quality adjustment unit 304 performs image quality adjustment of brightness, contrast, synchronization, tracking, color density, and color tone, for example, so that the projection image after distortion correction is in a desired display state.

Herein, retiming performed by the image correction unit 303 will be described. FIG. 18 illustrates a conceptual diagram of retiming. A rotation angle $\theta_{mh}$ of the rotation axis of the horizontal mirror 203 reciprocates once between a minimum value of an amplitude in a negative direction and a maximum value of the amplitude in a positive direction in each period defined by a horizontal synchronization signal or the like, as indicated by a reference number 1801 in FIG. 18. Meanwhile, a rotation angle $\theta_{mv}$ of the rotation axis of the vertical mirror 204 is substantially reduced monotonously from a maximum value of an amplitude in a positive direction to a minimum value of the amplitude in a negative direction in each period defined by a vertical synchronization signal or the like and is then returned to the maximum value of the amplitude in the positive direction in a blank period, as indicated by the reference number 1802 in FIG. 18. As a result, a scanning line of laser beams is not a straight line, as indicated by a reference number 1803 in FIG. 18.

When laser beams are emitted from the light source 201 in each predetermined irradiation period, points "O" placed on the scanning line 1803 are output points of laser beams (hereinafter, also referred to as "retiming positions") in, for example, FIG. 18. Each retiming position has a resampled brightness value. A laser irradiation width 1805 is slightly smaller than the amplitude 1804 of the horizontal mirror 203, and the laser irradiation width 1805 serves as a drawing effective region 1806.

Because the scanning line 1803 is not a straight line, one pixel of an original image and an output point of laser beams do not correspond to each other, also as is clear from FIG. 18. Therefore, retiming, i.e., processing for converting pixel data into the mirror angles of the horizontal mirror 203 and the vertical mirror 204 and brightness values corresponding thereto is needed.

In addition, because the scanning line 1803 is not a straight line and a scanning speed in the horizontal direction is not constant, density of output points of laser beams is sparse and dense depending on irradiation positions (mirror angles). Also as is clear from FIG. 18, the density of the output points of the laser beams in the vicinity of a center of a drawing region in the horizontal direction is low, whereas the density of the output points of the laser beams in the vicinity of right and left sides thereof is high. This causes brightness distortion of a projection image.

B. Distortion Correction of Projection Image

The projection-type image display device 100 according to this embodiment performs dimensional scanning with laser beams emitted from the light source 201 with the use of mirrors such as MEMS mirrors to thereby form a projection image on the screen 206. Shape distortion is generated in the projection image because the laser beams do not vertically irradiate the mirrors 203 and 204. Further, when free-scanning is performed with laser beams, brightness distortion is generated in the projection image because output points of the laser beams are sparse and dense due to inconstant moving speed of an irradiation position of the laser beams and the irradiation angle onto the screen.

In view of this, the projection-type image display device 100 improves an image quality by correcting both distortion of a shape and deviation of brightness distribution generated in an image projected on the screen. Even in a case where the projection unit 101 does not face the screen, it is possible to project an image having no shape distortion and no brightness distortion on the screen.

As described above, the projection-type image display device 100 outputs distortion correction information on shape distortion and brightness distortion of the projection image in a table form, and therefore it is possible to reduce a size of a memory for holding information for correction.

Figure 4:
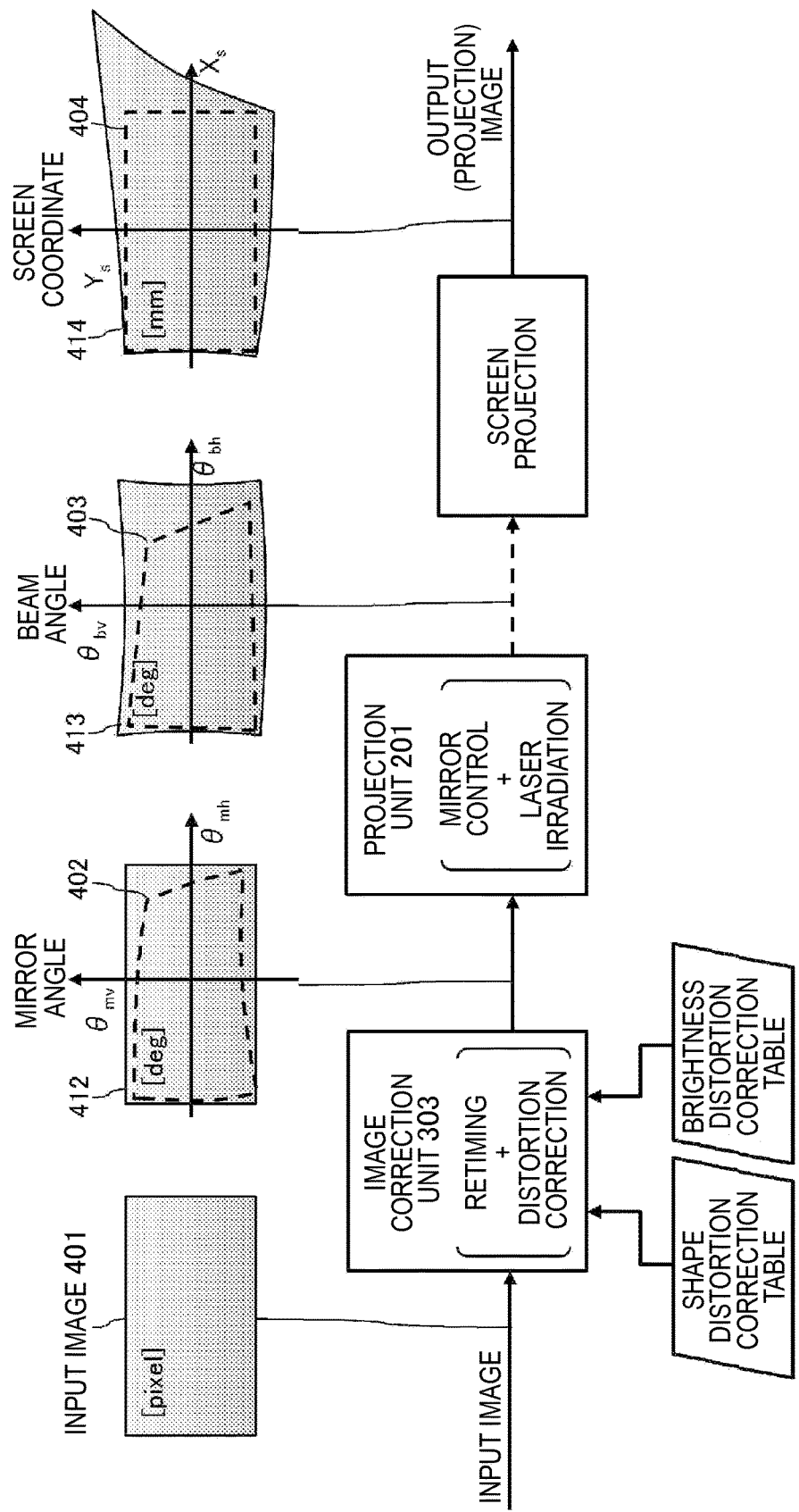
FIG. 4 is a diagram schematically illustrating a flow in which the projection-type image display device 100 projects an input image on a screen 206.

FIG. 4 schematically illustrates a flow in which the projection-type image display device 100 projects an input image on the screen 206.

The image correction unit 303 performs retiming on an input image 401 inputted to the image input unit 103 and performs correction processing of distortion on the basis of the shape distortion correction table and the brightness distortion correction table. By retiming, the image after image correction is mapped on a mirror angle space formed by the rotation angle $\theta_{mh}$ of the rotation axis of the horizontal mirror 203 and the rotation angle $\theta_{mv}$ of the rotation axis of the vertical mirror 204. In FIG. 4, an outer circumference 412 of the image on the mirror angle space, which is obtained in a case where only retiming is performed without distortion correction, is indicated by a solid line, and an outer circumference 402 of the image on the mirror angle space, which is obtained in a case where both retiming and distortion correction are performed, is indicated by a dotted line. In the example illustrated FIG. 4, the image 402 after the distortion correction is deteriorated from the original input image 412.

Then, in the projection unit 101, free-scanning is performed, i.e., scanning with laser beams of the light source 201 in the vertical direction by the vertical mirror 204 is performed in synchronism with reciprocal scanning with laser beams of the light source 201 in the horizontal direction by the horizontal mirror 203, and the light source 201 intermittently (in a predetermined short period) emits laser beams at brightness corresponding to pixel information. By the free-scanning, the image after image correction is mapped on a beam angle space formed by a beam angle $\theta_{bh}$ in the horizontal direction and a beam angle $\theta_{bv}$ in the vertical direction. Because laser beams do not vertically irradiate the mirrors 203 and 204 due to the deflection angles of the horizontal mirror 203 and the vertical mirror 204, the image is distorted. In FIG. 4, an outer circumference 413 of the image on the beam angle space, which is obtained in a case where only retiming is performed without distortion correction, is indicated by a solid line, and a beam angle 403 of an outer circumference of the image, which is obtained in a case where both retiming and distortion correction are performed, is indicated by a dotted line. In the example illustrated FIG. 4, the image 403 after distortion correction is deteriorated from the beam angle 413 of an outer circumference of the original input image.

In a case where free-scanning is performed with laser beams emitted from the light source 201 with the use of the horizontal mirror 203 and the vertical mirror 204, a projection image is formed on the screen 206, and the image after image correction is mapped on a screen coordinate system in which two axes $X_s$ and $Y_s$ are orthogonal to each other. At this time, because the projection unit 101 does not face the screen 206, the image is further distorted. In FIG. 4, an outer circumference 414 of the projection image on the screen 206, which is obtained in a case where retiming is performed without distortion correction, is indicated by a solid line, and an outer circumference 404 of the projection image, which is obtained in a case where both retiming and distortion correction are performed, is indicated by a dotted line. As illustrated in FIG. 4, by performing the shape distortion correction and the brightness distortion correction, the projection image on the screen 206 is an image having no distortion, i.e., the outer circumference 404 thereof is similar to the outer circumference of the input image 401. On the contrary, in a case where the image distortion is not performed, the outer circumference 414 thereof is largely deviated from an ideal shape.

Hereinafter, a method of calculating the shape distortion correction table and the brightness distortion correction table in the correction table calculation unit 104 will be described in detail.

B-1. Shape Distortion Correction Table

The image correction unit 303 obtains a reference pixel position in an original image by interpolation and uses the shape distortion correction table in order to determine intensity of laser beams emitted from the projection unit 101 at the time of retiming. By the shape distortion correction, distortion derived from the horizontal mirror 203 and the vertical mirror 204 and shape distortion of an image on the screen, which is generated by not facing the screen, can be cancelled.

Figure 5:
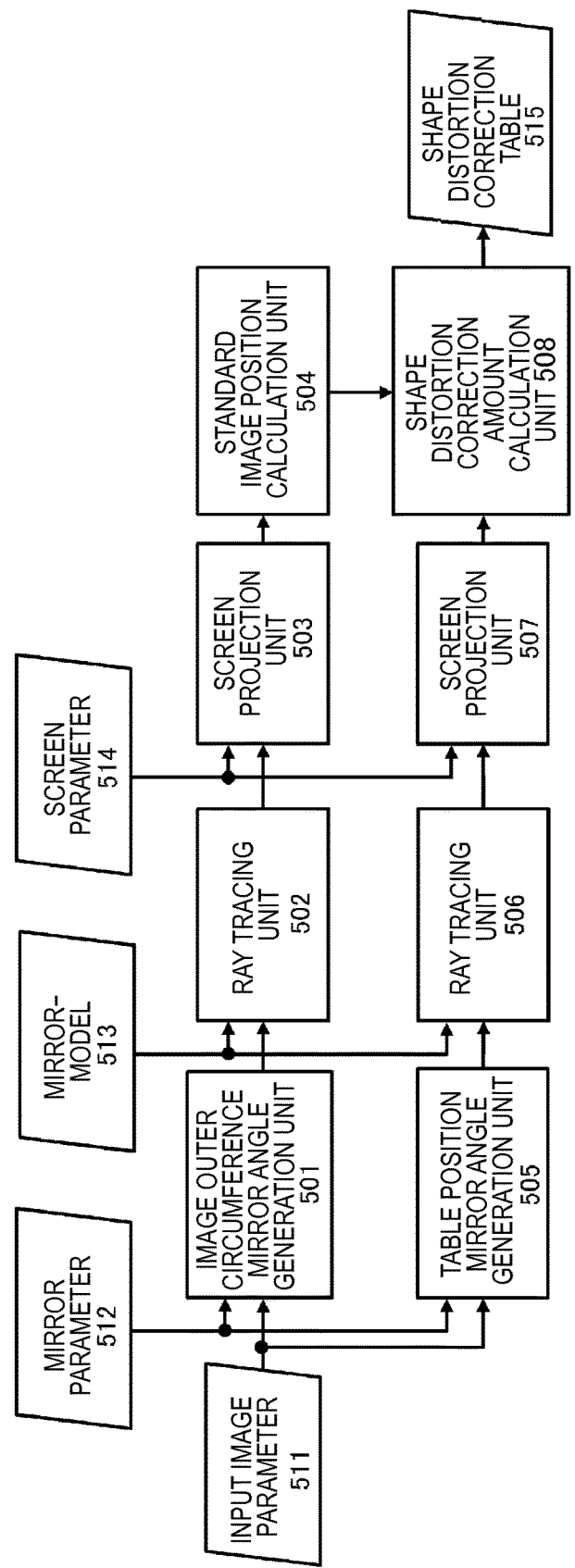
FIG. 5 is a diagram illustrating a functional configuration for calculating a shape distortion correction table.

FIG. 5 illustrates a functional configuration for calculating a shape distortion correction table in the correction table calculation unit 104. The correction table calculation unit 104 calculates a shape distortion correction table having shape distortion correction amounts in respective discrete shape distortion correction table calculation positions on an input image space.

An image outer circumference mirror angle generation unit 501 generates information on a mirror angle corresponding to an image outer circumference portion (corresponding to the outer circumference 412 of the image in FIG. 4) of an input image supplied from the image input unit 103 on the basis of an input image parameter 511 including an input image size and a mirror-parameter 512 including the mirror deflection angles of the horizontal mirror 203 and the vertical mirror 204, the effective beam region information, and the mirror angle information at the time of retiming.

Specifically, the image outer circumference mirror angle generation unit 501 causes the input image to equally correspond in the horizontal direction and in the vertical direction so that pixels of the input image fall within the amplitudes of the horizontal mirror 203 and the vertical mirror 204 in a drawing effective region (range that can be irradiated with laser beams by the projection unit 101). At this time, assuming that the pixels of the input image have a size, a periphery (not center position) of the pixels corresponds to the drawing effective region in the horizontal mirror 203 and the vertical mirror 204.

Figure 6:
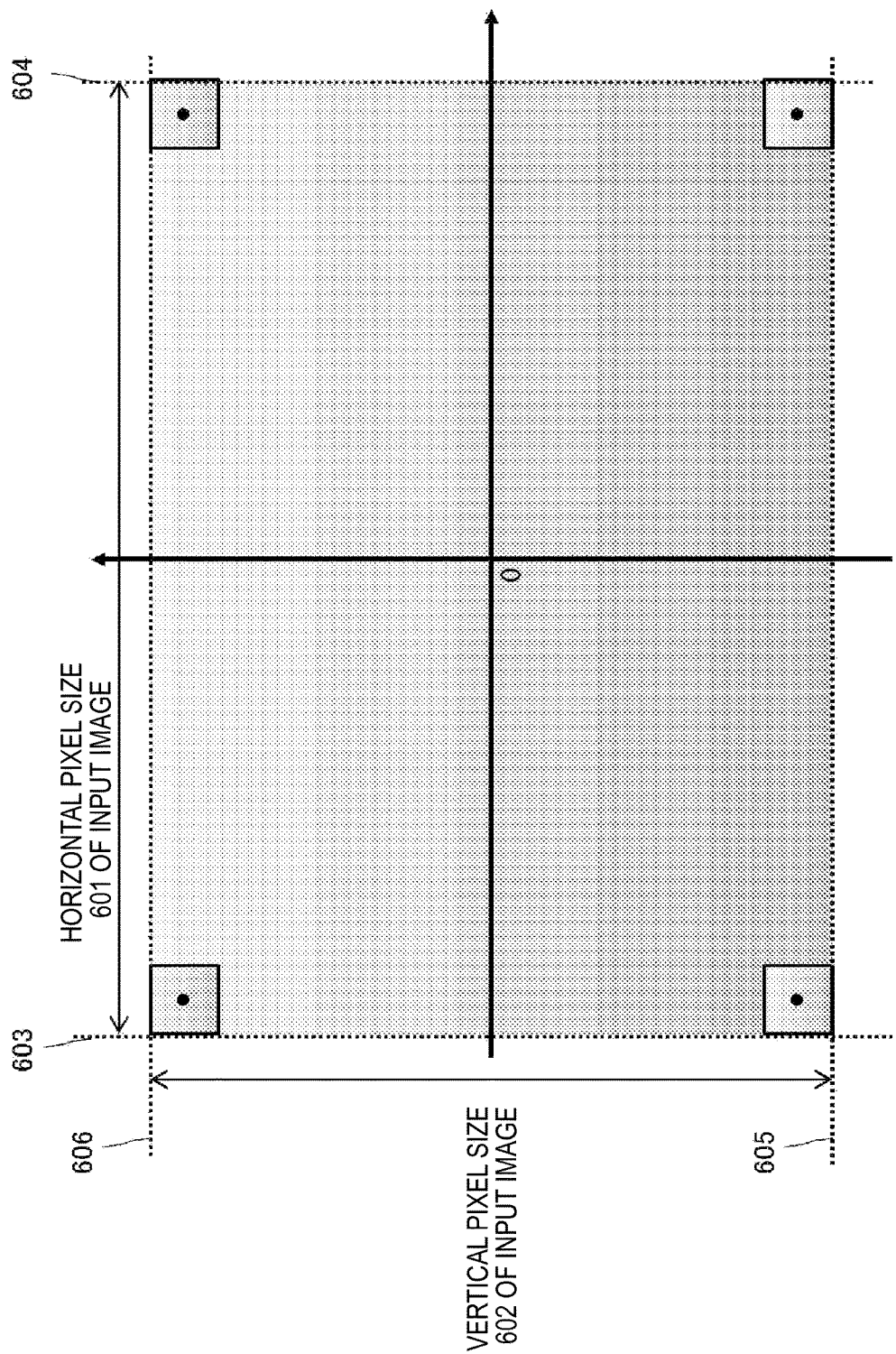
FIG. 6 is a diagram for describing correspondence between an input image space and a mirror angle space.

FIG. 6 illustrates correspondence between an input image space and a mirror angle space. In the example illustrated FIG. 6, the image outer circumference mirror angle generation unit 501 generates, on the basis of a horizontal pixel size 601 of an input image, a minimum value 603 of the amplitude in the negative direction of the horizontal mirror 203 and a maximum value 604 of the amplitude in the positive direction thereof in the drawing effective region. In addition, the image outer circumference mirror angle generation unit 501 generates, on the basis of a vertical pixel size 602 of the input image, a minimum value 605 of the amplitude in the negative direction of the vertical mirror 204 and a maximum value 606 of the amplitude in the positive direction thereof in the drawing effective region.

A ray tracing unit 502 calculates an emission direction of laser beams emitted from the light source 201 (corresponding to the beam angle 413 in FIG. 4) at the time of the mirror angle of the outer circumference of the input image generated in the image outer circumference mirror angle generation unit 501 (i.e., the minimum value of the amplitude in the negative direction and the maximum value of the amplitude in the positive direction in the horizontal mirror 203 and those in the vertical mirror 204 in the drawing effective region) on the basis of a mirror-model 513 including the mirror positions of the horizontal mirror 203 and the vertical mirror 204, the mirror rotation axes thereof, and the optical arrangement information of the light source 101. Note that, in a case where information on a beam diameter is unnecessary, only a center of an optical axis of laser beams is subjected to ray tracing.

The screen projection unit 503 calculates a position at which laser beams emitted in the emission direction obtained by the ray tracing unit 502 are projected on the screen 206, i.e., a region corresponding to the outer circumference of the input image (corresponding to the outer circumference 414 of the projection image in FIG. 4) on the basis of a screen-parameter 514 including position information of the screen 206 relative to the projection unit 101. In this way, a position on the screen 206, which corresponds to the outer circumference of the input image, is obtained.

Figure 7:
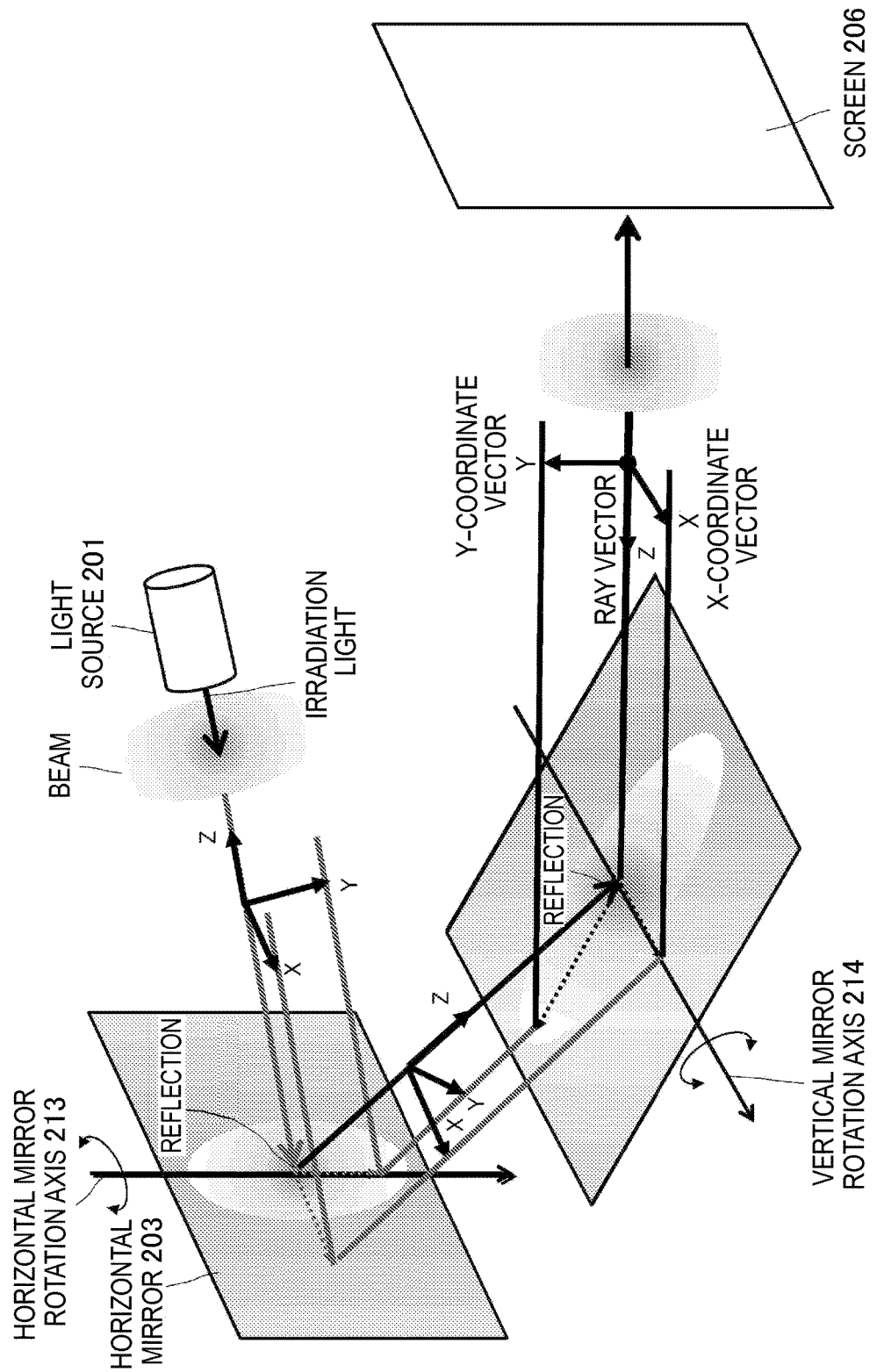
FIG. 7 is a diagram illustrating a state in which laser beams emitted from a light source 201 are subjected to ray tracing to obtain a projection position on the screen 206.

FIG. 7 illustrates a state in which tracing laser beams emitted from the light source 201 are subjected to ray tracing to obtain a projection position on the screen 206.

Note that, based on a surface orthogonal to an optical axis of laser beams, a beam shape is not changed and a size of the beams depends on a distance. An optical axis direction of laser beams and a direction of beams depend on reflection of the horizontal mirror 203 and the vertical mirror 204.

Then, a standard image position calculation unit 504 calculates a region that has the same aspect ratio as the input image and is inscribed with or included in the region corresponding to the outer circumference of the input image on the screen 206, which has been obtained by the screen projection unit 503, and sets the region as a standard image position on the screen 206.

Figure 8:
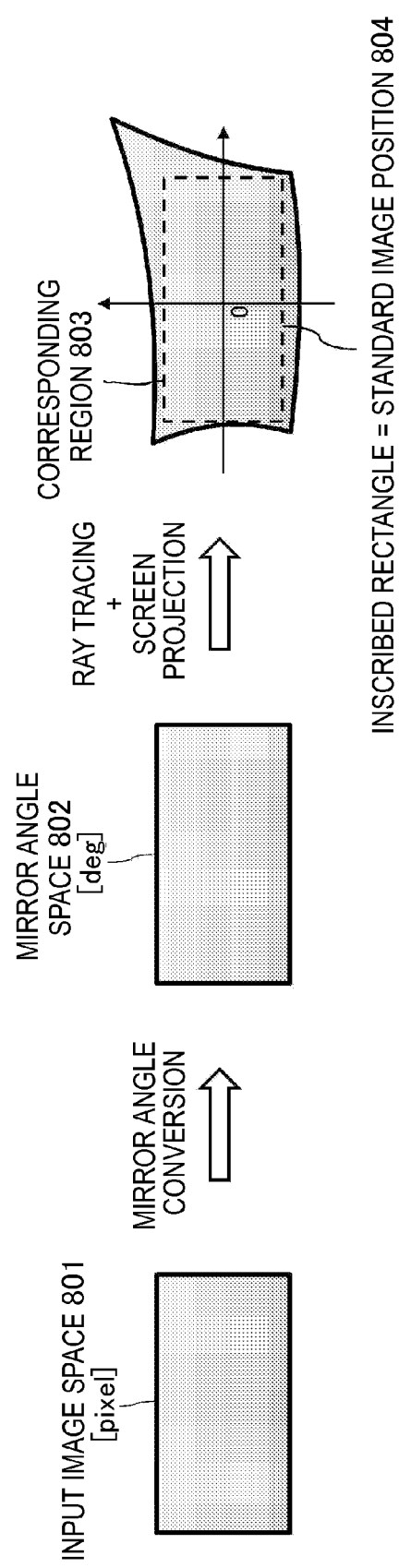
FIG. 8 is a diagram for describing a procedure for obtaining a standard image position from an input image.

FIG. 8 illustrates a procedure for obtaining a standard image position from an input image. The image outer circumference mirror angle generation unit 501 calculates mirror angles of the horizontal mirror 203 and the vertical mirror 204, which correspond to an outer circumference of the input image, to convert an input image space 801 into a mirror angle space 802. The ray tracing unit 502 calculates an emission direction of laser beams emitted from the light source 201 in an outer circumference on the mirror angle space 802. Further, the screen projection unit 503 calculates a position at which laser beams emitted in the emission direction is projected on the screen 206, to thereby obtain a region 803 on the screen 206, which corresponds to the outer circumference of the input image. Then, the standard image position calculation unit 504 calculates a region (inscribed rectangle) that is inscribed with this corresponding region 803 and has the same aspect ratio as the input image, i.e., calculates a standard image position 804.

Meanwhile, a table position mirror angle generation unit 505 generates, on the basis of the input image parameter 511 and the mirror-parameter 512, information on a mirror angle corresponding to each shape distortion correction table calculation position on the input image space in which shape distortion correction amount is calculated.

A ray tracing unit 506 calculates, on the basis of the mirror-model 513, an emission direction of laser beams emitted from the light source 201, which corresponds to the mirror angle in each shape distortion correction table calculation position on the mirror angle space generated in the table position mirror angle generation unit 505.

A screen projection unit 507 calculates, on the basis of the screen-parameter 514, a position at which laser beams emitted in the emission direction obtained by the ray tracing unit 506 are projected on the screen 206. In this way, a position on the screen 206, which corresponds to each shape distortion correction table calculation position, is obtained.

Then, a shape distortion correction amount calculation unit 508 normalizes the position corresponding to each shape distortion correction table calculation position on the screen 206, which has been obtained in the screen projection unit 507, on the basis of the standard image position that has been obtained by the standard image position calculation unit 504 in advance and sets the position as a shape distortion correction amount in a corresponding shape distortion correction table calculation position. In this way, a shape distortion correction table 515 in which the shape distortion correction amounts in the respective shape distortion correction table calculation positions are described is completed.

Figure 9:
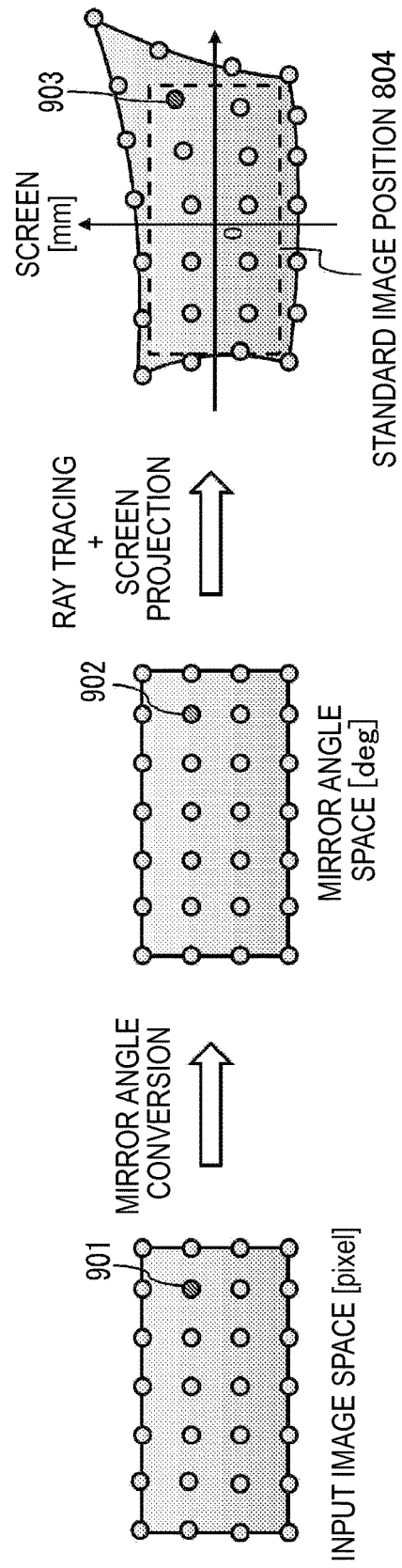
FIG. 9 is a diagram for describing a procedure for obtaining a shape distortion correction amount in each table position on an input image.

FIG. 9 illustrates a procedure for obtaining a shape distortion correction amount in each shape distortion correction table calculation position on an input image. In FIG. 9, shape distortion correction table calculation positions on an input image space and positions corresponding to the shape distortion correction table calculation positions on a mirror angle space and the screen are indicated by circles "O".

The table position mirror angle generation unit 505 calculates a mirror angle corresponding to each shape distortion correction table calculation position 901 on the input image space to convert the mirror angle into a corresponding position 902 on the mirror angle space. The ray tracing unit 506 calculates an emission direction of laser beams emitted from the light source 201 on the basis of a mirror angle in each mirror angle space 902 on the mirror angle space. Further, the screen projection unit 507 obtains a position at which laser beams emitted in the emission direction are projected on the screen 206, i.e., obtains a corresponding position 903 on the screen 206, which corresponds to each shape distortion correction table calculation position 901 on the input image space. The shape distortion correction amount calculation unit 508 normalizes the corresponding position 903 on the screen 206, which corresponds to each shape distortion correction table calculation position 901, on the basis of the inscribed rectangle of the standard image position 804. Then, the position is set as a shape distortion correction amount in a corresponding shape distortion correction table calculation position.

Figure 10:
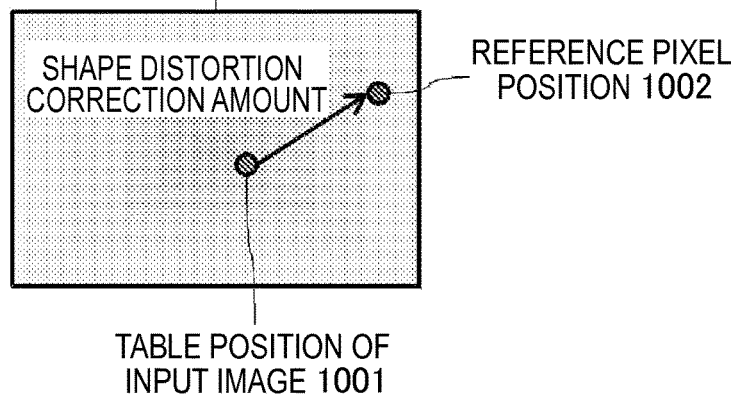
FIG. 10 is a diagram illustrating a relationship between a table position on an input image space and a reference pixel position thereof.

The shape distortion correction table calculated by the shape distortion correction amount calculation unit 508 includes the shape distortion correction amounts obtained in the respective shape distortion correction table calculation positions on the input image space. In a space in which normalization has been performed so that the standard image position and the input image space correspond to each other, the shape distortion correction amount in each shape distortion correction table calculation position corresponds to a reference pixel position 1002 relative to a shape distortion correction table calculation position 1001 on the input image space (see FIG. 10).

Figure 11:
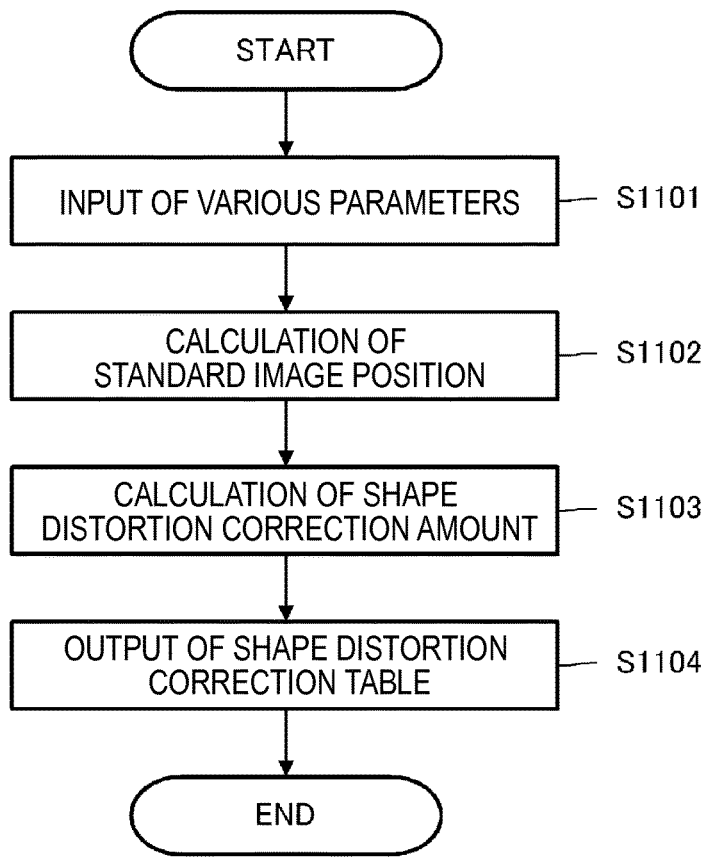
FIG. 11 is a flowchart illustrating a processing procedure for calculating a shape distortion correction table in a correction table calculation unit 104.

FIG. 11 illustrates a processing procedure for calculating a shape distortion correction table in the correction table calculation unit 104 in a flowchart form.

Various parameters needed for calculation, such as the input image parameter 511 including an input image size, the mirror-parameter 512 including the mirror deflection angles of the horizontal mirror 203 and the vertical mirror 204, the effective beam region information, and the mirror angle information at the time of retiming, the mirror-model 513 including the mirror positions of the horizontal mirror 203 and the vertical mirror 204, the mirror rotation axes thereof, and the optical arrangement information on the light source 101, and the screen-parameter 514 including the position information of the screen 206 relative to the projection unit 101, are inputted (Step S1101).

Next, a standard image position that is inscribed with a corresponding region projected on the screen 206, which corresponds to an outer circumference of an input image, and has the same aspect ratio as the input image is calculated (Step S1102).

As described above, a region on the screen 206, which corresponds to the outer circumference of the input image, is obtained by the following procedures: the image outer circumference mirror angle generation unit 501 generates information on a mirror angle corresponding to the outer circumference of the input image; the ray tracing unit 502 calculates an emission direction of laser beams emitted from the light source 201 at the time of the mirror angle; and the screen projection unit 503 obtains a position at which laser beams in the emission direction are projected on the screen 206. Then, the standard image position calculation unit 504 calculates a region that is inscribed with or included in the corresponding region and has the same aspect ratio as the input image, and sets the region as the standard image position on the screen 206.

Next, a shape distortion correction amount in each table position is calculated (Step S1103).

As described above, a corresponding position of each table position on the screen 206 is obtained by the following procedures: the table position mirror angle generation unit 505 generates information on a mirror angle corresponding to each table position; the ray tracing unit 506 calculates an emission direction of laser beams corresponding to the mirror angle in each table position; and the screen projection unit 503 obtains a position at which laser beams in the emission direction are projected on the screen 206. Then, the shape distortion correction amount calculation unit 508 normalizes the corresponding position of each table position on the screen 206, which has been obtained in the screen projection unit 507, on the basis of the standard image position that has been obtained in advance and sets the position as a shape distortion correction amount in the corresponding table position.

In this way, the shape distortion correction table 515 in which the shape distortion correction amounts in the respective shape distortion table calculation positions are described is completed and is outputted (Step S1104). Thus, this processing routine is terminated.

By performing correction processing on the input image with the use of the shape distortion correction table 515 obtained as described above, the image correction unit 303 can cancel distortion derived from the horizontal mirror 203 and the vertical mirror 204 and shape distortion of an image on the screen, which is generated by not facing the screen.

B-2. Brightness Distortion Correction Table

FIG. 7 illustrates a state in which laser beams emitted from the light source 201 are subjected to ray tracing. When brightness distortion is calculated, it is considered that laser beams have a beam diameter. Laser beams generally have a beam diameter defined by a Gaussian beam model having an optical axis as a center.

Laser beams emitted from the light source 201 are diffused until the beams reach the screen 206. In a case where laser beams are not vertically incident on the horizontal mirror 203 and the vertical mirror 204, beams are diffused and brightness is decreased. Specifically, beams are diffused and brightness is reduced from a center toward a periphery of the drawing effective region. That is, brightness distortion is generated in accordance with an irradiation angle onto the screen 206.

As described above with reference to FIG. 18, density of output points of laser beams is sparse and dense in the drawing effective region. In a region having high density in the vicinity of right and left sides of the drawing effective region in the horizontal direction, peripheral beams are overlapped to enhance brightness, whereas, in a region having low density in the vicinity of a center thereof in the horizontal direction, few peripheral beams are overlapped and therefore the brightness is hardly enhanced. That is, brightness distortion is generated in accordance with an overlap degree of beams even in the drawing effective region.

The image correction unit 303 uses a brightness distortion correction table in order to determine a gain of intensity of laser beams emitted by the projection unit 101 at the time of retiming by interpolation. By brightness distortion correction, distortion of brightness distribution of an image on the screen, which is generated by a difference of density of emission points of laser beams and diffusion of light beams, can be corrected. The brightness distortion correction table used herein is prepared to correspond to both brightness distortion caused by the irradiation angle onto the screen (beam diffusion) and brightness distortion caused by sparsity and density of output points of lasers.

Figure 12:
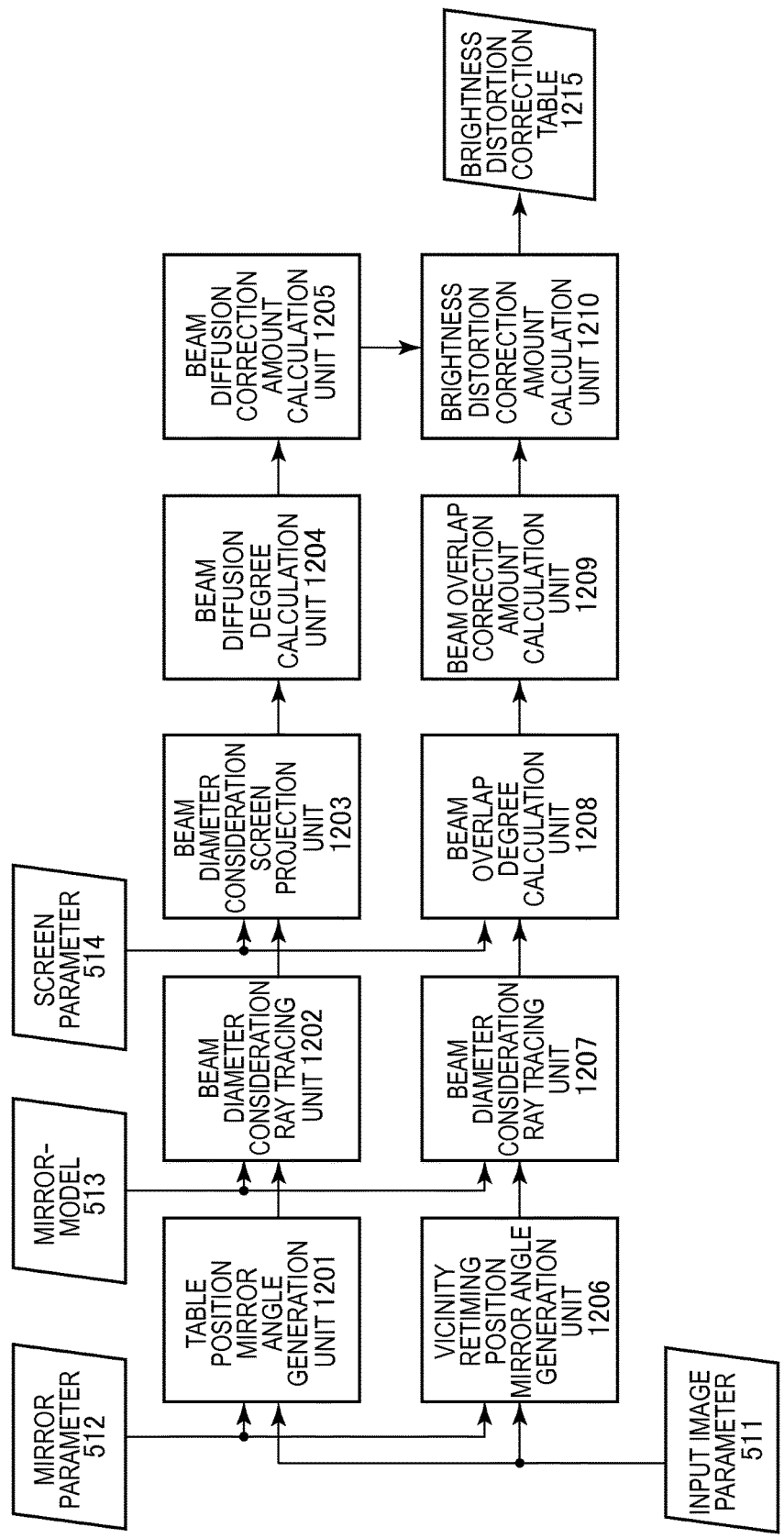
FIG. 12 is a diagram illustrating a functional configuration for calculating a brightness distortion correction table.

FIG. 12 illustrates a functional configuration for calculating a brightness distortion correction table in the correction table calculation unit 104. The correction table calculation unit 104 calculates the brightness distortion correction table having brightness distortion correction amounts in respective discrete brightness distortion correction table calculation position on an input image space. In this embodiment, the correction table calculation unit 104 calculates a correction amount of brightness distortion caused by an irradiation angle onto the screen (beam diffusion) in each brightness distortion correction table calculation position and a correction amount of brightness distortion caused by sparsity and density of output points of lasers and unifies both the correction amounts, thereby obtaining a final brightness distortion correction amount.

The correction table calculation unit 104 calculates the correction amount of the beam diffusion brightness distortion caused by the irradiation angle onto the screen (beam diffusion) by using a table position mirror angle generation unit 1201, a beam diameter consideration ray tracing unit 1202, a beam diameter consideration screen projection unit 1203, a beam diffusion degree calculation unit 1204, and a beam diffusion correction amount calculation unit 1205.

The table position mirror angle generation unit 1201 generates, on the basis of the input image parameter 511 and the mirror-parameter 512, information on a mirror angle corresponding to each brightness distortion correction table calculation position on the input image space in which brightness distortion correction amount is generated (see FIG. 6).

The beam diameter consideration ray tracing unit 1202 calculates, on the basis of the mirror-model 513, an emission direction of laser beams emitted from the light source 201, which corresponds to the mirror angle in each brightness distortion correction table calculation position (see FIG. 7). At this time, the emission direction of the laser beams and an extent thereof are calculated in consideration of the beam diameter defined by the Gaussian beam model.

The beam diameter consideration screen projection unit 1203 calculates, on the basis of the screen-parameter 514, a position at which beams in the emission direction obtained by the beam diameter consideration ray tracing unit 1202 are projected on the screen 206 and an extent thereof.

Figure 13:
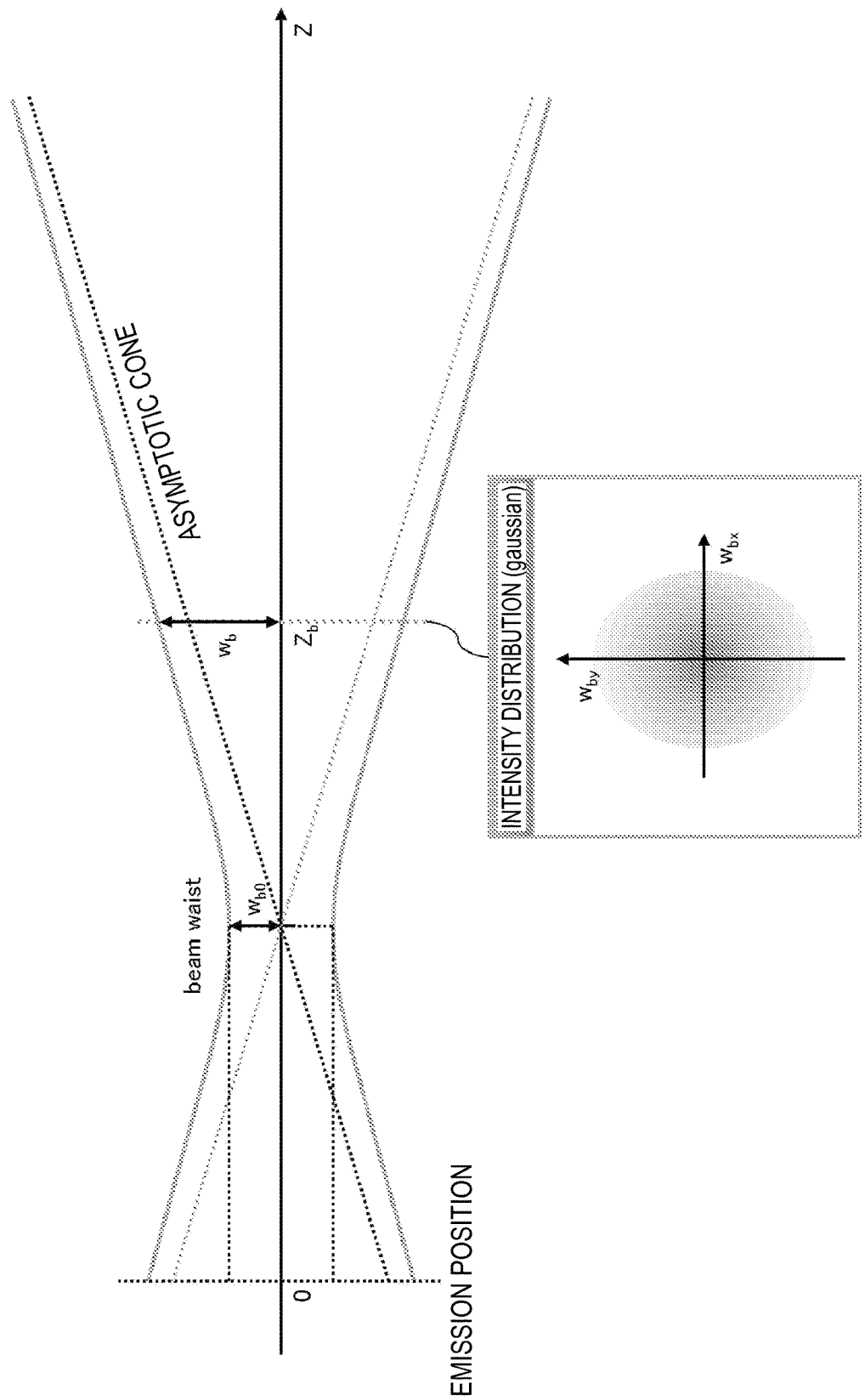
FIG. 13 is a diagram for describing a Gaussian beam model.

FIG. 13 illustrates a Gaussian beam model. Note that FIG. 13 is illustrated without considering reflection of laser beams on the horizontal mirror 203 and the vertical mirror 204. When a beam diameter in a beam-waist is set to $w_{b0}$, a beam diameter $w_b$ in a beam irradiation position $z_b$ is expressed as the following formula (1). Note that the beam diameter $w_b$ is a system which is maximum intensity/$e^2$. A shape of beams in an xy plane surface orthogonal to the beam irradiation position $z_b$ is an oval shape expressed as the following formula (2), and intensity distribution (Gaussian distribution) p (x, y) thereof is expressed as the following formula (3).

[Math 1]

$$w_b = w_{b0}\sqrt{\left(1+\left(\frac{C \cdot z_b}{\pi \cdot w_{b0}^2}\right)^2\right)} \quad (1)$$

[Math 2]

$$\frac{x^2}{w_{bx}^2} + \frac{y^2}{w_{by}^2} = 1 \quad (2)$$

[Math 3]

$$p(x, y) = \frac{2P}{\pi w_{bx} w_{by}}\exp\left(-2\left(\frac{x^2}{w_{bx}^2} + \frac{y^2}{w_{by}^2}\right)\right) \quad (3)$$

The beam diffusion degree calculation unit 1204 calculates, on the basis of the extent of the beams obtained in the beam diameter consideration screen projection unit 1203, an extent degree of the beams in the brightness distortion correction table calculation position.

Then, the beam diffusion correction amount calculation unit 1205 calculates, on the basis of the extent degree of the beams obtained in the beam diffusion degree calculation unit 1204, a correction amount (hereinafter, also referred to as "beam diffusion correction amount") $W_2$ of brightness distortion caused by beam diffusion in the brightness distortion correction table calculation position.

Figure 14:
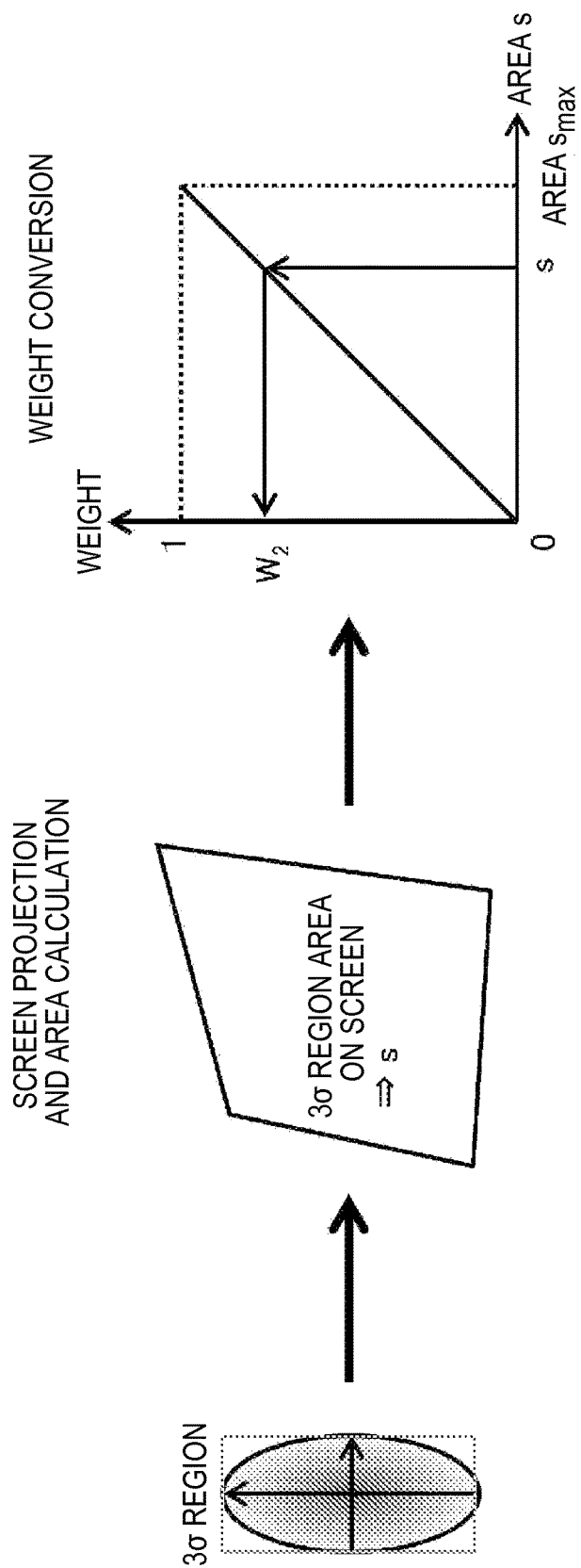
FIG. 14 is a diagram for describing a mechanism for calculating a beam diffusion correction amount.

FIG. 14 illustrates a mechanism for calculating a beam diffusion correction amount. The beam diffusion degree calculation unit 1204 calculates, on the basis of the extent of the beams obtained in the beam diameter consideration screen projection unit 1203, the extent degree of the beams in the table position, as an area s of a 3σ region on the screen 206. Then, the beam diffusion correction amount calculation unit 1205 normalizes the calculated area s on the basis of a certain extent degree $s_{max}$. In this way, in the table position, the correction amount $W_2$ for reducing beam brightness that becomes bright on the screen 206 having a small extent is calculated.

The correction table calculation unit 104 calculates a correction amount of beam overlap brightness distortion caused by sparsity and density of output points of lasers by using a vicinity retiming position mirror angle generation unit 1206, a beam diameter consideration ray tracing unit 1207, a beam overlap degree calculation unit 1208, and a beam overlap correction amount calculation unit 1209.

The vicinity retiming position mirror angle generation unit 1206 calculates, on the basis of the mirror-parameter 512, mirror angles in retiming positions in the vicinity of the mirror angle corresponding to the brightness distortion correction table calculation position.

The beam diameter consideration ray tracing unit 1207 calculates, on the basis of the mirror-model 513, emission directions of laser beams emitted from the light source 201, which correspond to the mirror angles in the retiming positions in the vicinity thereof (see FIG. 7). At this time, the emission directions of the laser beams and extent degrees thereof are calculated in consideration of the beam diameter defined by the Gaussian beam model.

The beam overlap degree calculation unit 1208 calculates, on the basis of the emission directions of the laser beams and the extent degrees thereof, which have been obtained in the beam diameter consideration ray tracing unit 1207, a relative overlap degree of beams in the retiming positions in the vicinity of the brightness distortion correction table calculation position.

Figure 15A:
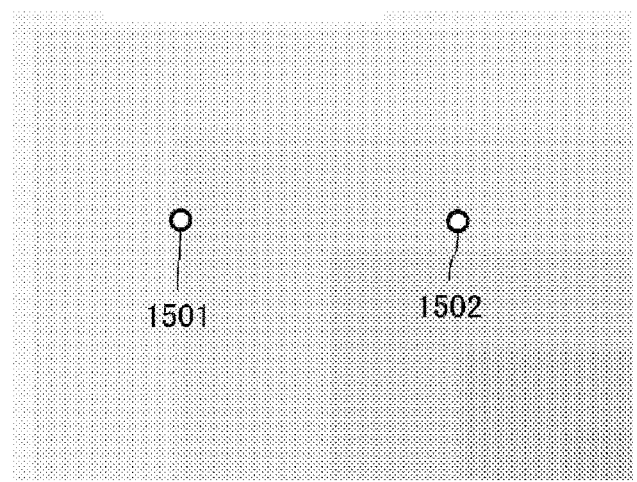
FIG. 15A is a diagram illustrating a state in which retiming positions in the vicinity of brightness distortion correction table calculation positions are extracted based on a result of ray tracing.
Figure 15B:
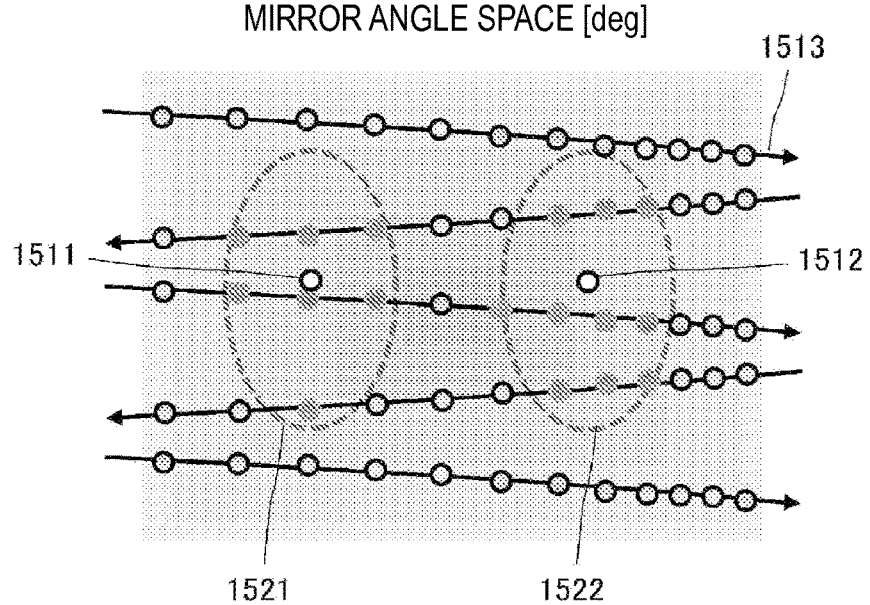
FIG. 15B is a diagram illustrating the state in which the retiming positions in the vicinity of the brightness distortion correction table calculation positions are extracted based on the result of the ray tracing.

FIG. 15 illustrate a state in which retiming positions in the vicinity of brightness distortion correction table calculation positions are extracted based on a result of ray tracing in the beam overlap degree calculation unit 1208. FIG. 15A illustrate brightness distortion correction table calculation positions 1501 and 1502 on an input image space in which brightness correction distortion correction amounts are calculated. FIG. 15B illustrates positions 1511 and 1512 on a mirror space, which correspond to the brightness distortion correction table calculation positions 1501 and 1502, together with a scanning line 1513 (indicated by an arrow in FIG. 15) of laser beams in the periphery thereof and retiming positions (indicated by circles "O" in FIG. 15). As described above with reference to FIG. 18, the brightness distortion correction table calculation positions 1501 and 1502 on the input image space are subjected to retiming to intensity in output points of laser beams on the scanning line 1513.

The beam overlap degree calculation unit 1208 extracts peripheral retiming positions as noted data positions for use in calculation of the brightness distortion correction table in each corresponding position of the brightness distortion correction table calculation position. In FIG. 15B, a plurality of noted data positions included in each of the peripheral regions 1521 and 1522 whose the corresponding positions 1511 and 1512 are surrounded by dotted lines are extracted, and retiming positions extracted as the noted data positions are colored by gray. Then, the beam overlap degree calculation unit 1208 calculates a relative overlap degree of beams in each noted data position in each corresponding position (peripheral region 1521 or 1522) on the basis of the output direction of the beams and the extent degree of the beams obtained in the beam diameter consideration ray tracing unit 1207.

The beam overlap correction amount calculation unit 1209 calculates a beam overlap degree correction amount on the basis of the beam overlap degree obtained in the beam overlap degree calculation unit 1208. Beam overlap degrees in the respective retiming positions become ununiform due to sparsity and density of output points of lasers and appear as brightness distortion of the projection image on the screen 206. Therefore, the beam overlap correction amount calculation unit 1209 calculates a correction amount that reduces brightness as the beam overlap degree becomes larger, thereby generating a correction amount for reducing brightness in a part that becomes bright due to high density of output points of laser beams.

FIG. 16 illustrates a mechanism for calculating a brightness distortion correction amount based on a beam overlap degree.

Figure 16A:
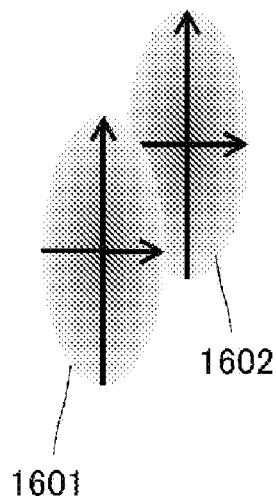
FIG. 16A is a diagram illustrating a mechanism for calculating a brightness correction amount based on a beam overlap degree.
Figure 16B:
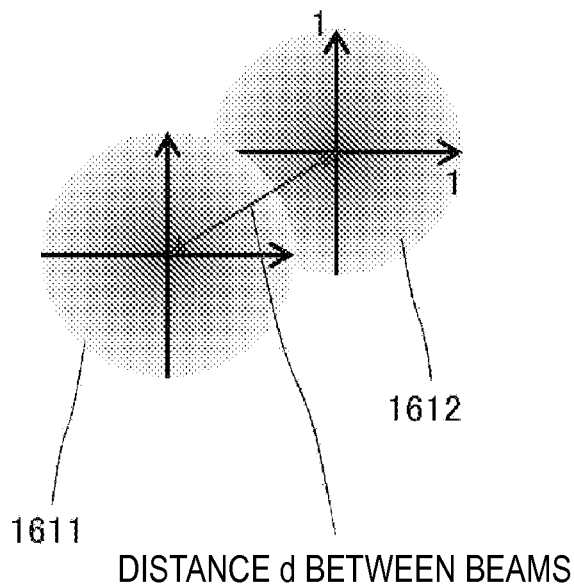
FIG. 16B is a diagram illustrating the mechanism for calculating the brightness correction amount based on the beam overlap degree.

FIG. 16A illustrates a state in which beams 1601 in a first noted data position and beams 1602 in a second noted data position of packaging thereof are overlapped with each other. The beam diameter consideration ray tracing unit 1207 calculates emission directions in the beams 1601 and 1602 in the respective noted data positions and extent degrees thereof. The beams basically have a Gaussian distribution shape having an optical axis as a center. However, beam diameters deviate in the horizontal direction and the vertical direction due to a difference between mirror angles of the horizontal mirror 203 and the vertical mirror 204. In view of this, as illustrated in FIG. 16B, the beam overlap degree calculation unit 1208 converts the beam diameters of the beams 1601 and 1602 in the respective noted data positions into beams 1611 and 1612 that are normalized in both the horizontal direction and the vertical direction to have Gaussian distribution of σ=1.

Figure 16C:
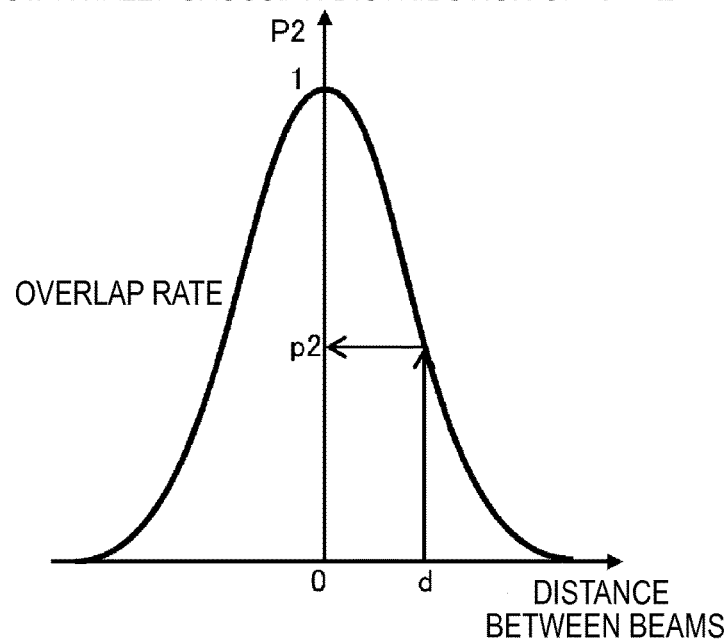
FIG. 16C is a diagram illustrating the mechanism for calculating the brightness correction amount based on the beam overlap degree.

The beam overlap degree calculation unit 1208 overlaps normalized beams 1611 and 1612 in the periphery of the all extracted noted data positions in each brightness distortion correction table calculation position. Then, as illustrated in FIG. 16C, the beams are normalized so that a maximum overlap rate becomes 1 to obtain an overlap rate of the beams. The overlap rate becomes Gaussian distribution of substantially $\sigma=2^{1/2}$.

Figure 16D:
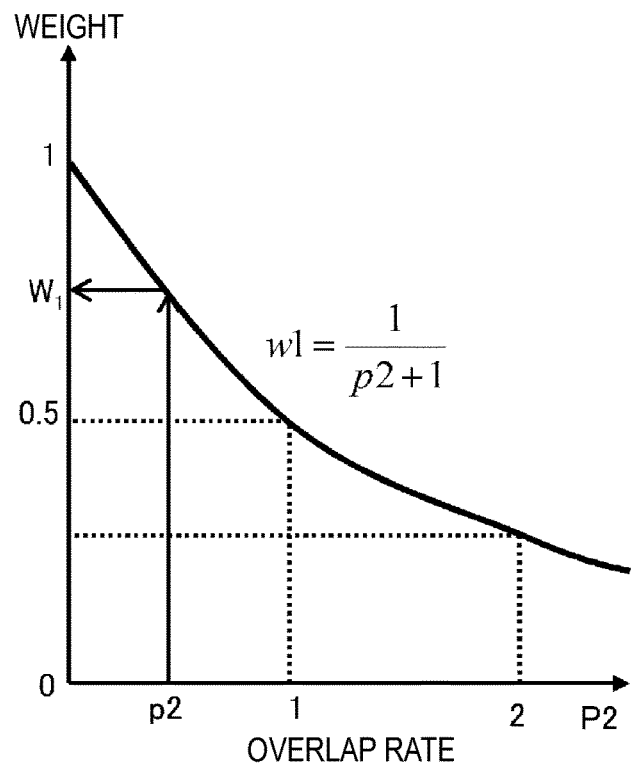
FIG. 16D is a diagram illustrating the mechanism for calculating the brightness correction amount based on the beam overlap degree.

Then, the beam overlap correction amount calculation unit 1209 converts the overlap rate obtained by the beam overlap degree calculation unit 1208 into a correction amount (hereinafter, also referred to as "beam overlap correction amount") $W_1$ of brightness distortion caused by the beam overlap degree in the brightness distortion correction table calculation position. Specifically, an overlap rate p2 in a distance d from a beam center is obtained as illustrated in FIG. 16C, and the beam overlap correction amount $W_1$ corresponding to the overlap rate p2 is obtained on the basis of a curved line of w1=1/(p2+1) as illustrated in FIG. 16D.

The brightness distortion correction amount calculation unit 1210 unifies the beam diffusion correction amount $W_2$ and the beam overlap correction amount $W_1$ calculated as described above in each brightness distortion correction table calculation position to set the unified correction amount as a brightness distortion correction amount W in each brightness distortion correction table calculation position. Specifically, as expressed as the following formula (4), the brightness distortion correction amount W is normalized so that the maximum value becomes 1 and is outputted as a brightness distortion correction table 1215.

[Math 4]

$$\text{Brightness distortion correction amount} = \frac{W_1 \times W_2}{\text{Maximum value of } W_1 \times W_2} \quad (4)$$

The image correction unit 303 performs, at the time of retiming, brightness distortion correction by multiplying brightness before brightness distortion correction by the corresponding brightness distortion correction amount W.

FIG. 17 illustrates a processing procedure for calculating a brightness distortion correction table in the correction table calculation unit 104 in a flowchart form.

Various parameters needed for calculation, such as the input image parameter 511 including an input image size, the mirror-parameter 512 including the mirror deflection angles of the horizontal mirror 203 and the vertical mirror 204, the effective beam region information, and the mirror angle information at the time of retiming, the mirror-model 513 including the mirror positions of the horizontal mirror 203 and the vertical mirror 204, the mirror rotation axes thereof, and the optical arrangement information on the light source 101, and the screen-parameter 514 including the position information of the screen 206 relative to the projection unit 101, are inputted (Step S1701).

Next, information on a mirror angle corresponding to each brightness distortion correction table calculation position on an input image space in which brightness distortion correction amount is generated is generated, and an emission direction of laser beams corresponding to the mirror angle and an extent thereof are calculated. A position at which beams in the emission direction are projected on the screen 206 and an extent thereof are calculated, and the beam diffusion correction amount $W_2$ in the brightness distortion correction table calculation position is calculated on the basis of the calculated extent degree of the beams (Step S1702).

A mirror angle in a retiming position in the vicinity of the mirror angle corresponding to the brightness distortion correction table calculation position is calculated, and an emission direction of laser beams corresponding to the mirror angle and an extent degree thereof are calculated. Based on this, a relative overlap degree of beams is calculated, and, on the basis of the overlap degree, the beam overlap correction amount $W_1$ is calculated in the brightness distortion correction table calculation position (Step S1703).

Then, the brightness distortion correction amount calculation unit 1210 unifies the beam diffusion correction amount $W_2$ and the beam overlap correction amount $W_1$ calculated in each brightness distortion correction table calculation position to set the unified correction amount as the brightness distortion correction amount W in each brightness distortion correction table calculation position (Step S1704).

A brightness distortion correction table 1215 in which the shape distortion correction amounts in the respective brightness distortion table calculation positions are described is completed and is outputted (Step S1705). In this way, this processing routine is terminated.

By performing correction processing on the input image with the use of the brightness distortion correction table obtained as described above, the image correction unit 303 can cancel distortion of brightness distribution of the image on the screen, which is generated by a difference of density of emission points of laser beams and diffusion of light beams.

INDUSTRIAL APPLICABILITY

In the above, the technology disclosed in the present specification has been described in detail with reference to the certain embodiment. However, it is obvious that a person skilled in the art can modify or substitute the embodiment without departing from the scope of the technology disclosed in the specification.

The present specification has described an embodiment regarding a projection-type image display device that rotatably drives a horizontal mirror and a vertical mirror in combination around a vertical axis and a horizontal axis, respectively, thereby deflecting laser beams to perform dimensional scanning. However, the technology disclosed in the present specification is similarly applicable also to a projection-type image display device that rotatably drives a single mirror around two axes, i.e., a vertical axis and a horizontal axis to perform dimensional scanning with laser beams.

In short, the technology disclosed in the specification has been described using the example, and the description contents of the specification should not be interpreted restrictively. In order to determine the scope of the technology disclosed in the specification, the claims should be taken into consideration.

Additionally, the technology disclosed in the present specification may also be configured as below.

(1)

A projection-type image display device including:

a projection unit including a light source configured to emit light having intensity corresponding to a pixel value of an input image and a deflection unit configured to deflect emitted light from the light source using a mirror to perform scanning on a projection object;

a retiming unit configured to perform retiming on pixel data of the input image in accordance with a deflection angle in the deflection unit;

a shape distortion correction table having a shape distortion correction amount in each shape distortion correction table calculation position, the shape distortion correction table being for correcting shape distortion included in a projection image on the projection object from the projection unit;

a brightness distortion correction table having a brightness distortion correction amount in each brightness distortion correction table calculation position, the brightness distortion correction table being for correcting brightness distortion included in the projection image; and an image correction unit configured to perform distortion correction on the input image by performing signal processing based on the shape distortion correction table and the brightness distortion correction table.

(2)

The projection-type image display device according to (1), further including:

a correction table calculation unit configured to calculate the shape distortion correction table and the brightness distortion correction table.

(3)

The projection-type image display device according to (2), wherein the correction table calculation unit calculates the shape distortion correction amount in each shape distortion correction table calculation position on the basis of an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

(4)

The projection-type image display device according to (3), wherein the correction table calculation unit generates mirror angle information corresponding to an outer circumference portion of the input image on the basis of the input image parameter and the mirror-parameter, performs ray tracing on an emission direction of light emitted from the light source in the outer circumference portion of the input image on the basis of the mirror-model, calculates a region on the projection object, the region corresponding to the outer circumference portion of the input image, on the basis of the projection object parameter, and calculates a standard image position including a region that is inscribed with the region corresponding to the outer circumference portion and has a same aspect ratio as the input image, generates mirror angle information corresponding to each shape distortion correction table calculation position on the basis of the input image parameter and the mirror-parameter, performs ray tracing on an emission direction of light emitted from the light source in each shape distortion correction table calculation position on the basis of the mirror-model, and calculates a position on the projection object, the position corresponding to each shape distortion correction table calculation position, on the basis of the projection object parameter, and normalizes the position on the projection object, the position corresponding to each shape distortion correction table calculation position, on the basis of the standard image position to obtain the shape distortion correction amount in each shape distortion correction table calculation position.

(5)

The projection-type image display device according to (2), wherein the correction table calculation unit calculates the brightness distortion correction table for correcting beam diffusion brightness distortion caused by a difference of beam diffusion of emitted light in each place in a drawing effective region of the projection object and beam overlap brightness distortion caused by an overlap degree of beams of emitted light in each place in the drawing effective region of the projection object.

(6)

The projection-type image display device according to (5), wherein the correction table calculation unit calculates the brightness distortion correction table for correcting the beam diffusion brightness distortion and the beam overlap brightness distortion on the basis of an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

(7)

The projection-type image display device according to (5), wherein the correction table calculation unit multiplies together the beam diffusion brightness distortion and the beam overlap brightness distortion obtained in each brightness distortion correction table calculation position to normalize a multiplied distortion and sets the multiplied distortion as a brightness distortion correction amount in the position.

(8)

The projection-type image display device according to (6), wherein the correction table calculation unit generates mirror angle information corresponding to each brightness distortion correction table calculation position on the basis of the input image parameter and the mirror-parameter, performs ray tracing on an emission direction of light emitted from the light source and an extent of beams in each brightness distortion correction table position on the basis of the mirror-model, calculates a position and the extent of the beams on the projection object, the position and the extent of the beams corresponding to each brightness distortion correction table calculation position, on the basis of the projection object parameter, calculates an extent degree of the beams in each brightness distortion correction table calculation position on the basis of the extent of the beams, and calculates a beam diffusion brightness distortion correction amount for reducing beam brightness in each brightness distortion correction table calculation position on the basis of the extent degree of the beams.

(9)

The projection-type image display device according to (8), wherein the correction table calculation unit calculates the beam diffusion brightness distortion correction amount by calculating the extent degree of the beams in each brightness distortion correction table calculation position as an area s of a 3σ region on the projection object and normalizing the area s on the basis of a predetermined extent degree $s_{max}$.

(10)

The projection-type image display device according to (6), wherein the correction table calculation unit calculates mirror angles in retiming positions in a vicinity of a mirror angle corresponding to each brightness distortion correction table calculation position on the basis of the mirror-parameter, performs ray tracing on emission directions of light emitted from the light source and extent degrees of beams corresponding to the mirror angles in the retiming positions in the vicinity of the mirror angle on the basis of the mirror-model, calculates a relative overlap degree of the beams in the retiming positions in the vicinity of the mirror angle on the basis of the emission directions of the light emitted from the light source and the extent degrees of the beams, and obtains, on the basis of the overlap degree, a beam overlap correction amount for reducing brightness in a part that becomes bright due to high density of output points of light in each brightness distortion correction table calculation position.

(11)

The projection-type image display device according to (10), wherein the correction table calculation unit normalizes the extent degree of the beams in each of the retiming positions in a periphery of the brightness distortion table calculation position in a manner that the beams have Gaussian distribution of σ=1 and then overlaps the beams to calculate the overlap degree, performs normalization in a manner that a maximum overlap rate becomes 1 to obtain an overlap rate of the beams, and obtains a beam overlap brightness distortion correction amount corresponding to an overlap rate p2 in a predetermined distance d from a beam center.

(12)

An image processing device including:

a projection unit configured to project an input image on an object and a parameter input unit configured to input a parameter regarding the input image;

a shape distortion correction table calculation unit configured to calculate, on the basis of the parameter, a shape distortion correction table for correcting shape distortion included in a projection image on the projection object from the projection unit; and a brightness distortion correction table calculation unit configured to calculate, on the basis of the parameter, a brightness distortion correction table for correcting brightness distortion included in the projection image.

(13)

The image processing device according to (12), wherein the projection unit includes a light source configured to emit light having intensity corresponding to a pixel value of the input image and a deflection unit configured to deflect emitted light from the light source using a mirror to perform scanning on a projection object, and performs retiming on pixel data of the input image in accordance with a deflection angle in the deflection unit to perform irradiation, and wherein the parameter input unit inputs an input image parameter including a size of the input image, a mirror-parameter including a deflection angle of the mirror of the polarization unit, effective beam region information, and mirror angle information at a time of retiming, a mirror-model including a position of the mirror and optical arrangement information of the mirror and the light source, and a projection object parameter including position information of the projection object relative to the projection unit.

(14)

The image processing device according to (13), wherein the shape distortion correction table calculation unit generates mirror angle information corresponding to an outer circumference portion of the input image on the basis of the input image parameter and the mirror-parameter, performs ray tracing on an emission direction of light emitted from the light source in the outer circumference portion of the input image on the basis of the mirror-model, calculates a region on the projection object, the region corresponding to the outer circumference portion of the input image, on the basis of the projection object parameter, and calculates a standard image position including a region that is inscribed with the region corresponding to the outer circumference portion and has a same aspect ratio as the input image, generates mirror angle information corresponding to each shape distortion correction table calculation position of the shape distortion correction table on the basis of the input image parameter and the mirror-parameter, performs ray tracing on an emission direction of light emitted from the light source in each shape distortion correction table calculation position on the basis of the mirror-model, and calculates a position on the projection object, the position corresponding to each shape distortion correction table calculation position, on the basis of the projection object parameter, and normalizes the position on the projection object, the position corresponding to each shape distortion correction table calculation position, on the basis of the standard image position to obtain the shape distortion correction amount in each shape distortion correction table calculation position.

(15)

The image processing device according to (13), wherein the brightness distortion correction table calculation unit calculates the brightness distortion correction table for correcting beam diffusion brightness distortion caused by a difference of beam diffusion of emitted light in each place in a drawing effective region of the projection object and beam overlap brightness distortion caused by an overlap degree of beams of emitted light in each place in the drawing effective region of the projection object.

(16)

The image processing device according to (15), wherein the brightness distortion correction table calculation unit multiplies together the beam diffusion brightness distortion and the beam overlap brightness distortion obtained in each brightness distortion correction table calculation position to normalize a multiplied distortion and sets the multiplied distortion as a brightness distortion correction amount in the position.

(17)

The image processing device according to (15), wherein the brightness distortion correction table calculation unit generates mirror angle information corresponding to each brightness distortion correction table calculation position on the basis of the input image parameter and the mirror-parameter, performs ray tracing on an emission direction of light emitted from the light source and an extent of beams in each brightness distortion correction table position on the basis of the mirror-model, calculates a position and the extent of the beams on the projection object, the position and the extent of the beams corresponding to each brightness distortion correction table calculation position, on the basis of the projection object parameter, calculates an extent degree of the beams in each brightness distortion correction table calculation position on the basis of the extent of the beams, and calculates a beam diffusion brightness distortion correction amount for reducing beam brightness in each brightness distortion correction table calculation position on the basis of the extent degree of the beams.

(18)

The image processing device according to (17), wherein the brightness distortion correction table calculation unit calculates the beam diffusion brightness distortion correction amount by calculating the extent degree of the beams in each brightness distortion correction table calculation position as an area s of a 3σ region on the projection object and normalizing the area s on the basis of a predetermined extent degree $s_{max}$.

(19)

The image processing device according to (15), wherein the brightness distortion correction table calculation unit calculates mirror angles in retiming positions in a vicinity of a mirror angle corresponding to each brightness distortion correction table calculation position on the basis of the mirror-parameter, performs ray tracing on emission directions of light emitted from the light source and extent degrees of beams corresponding to the mirror angles in the retiming positions in the vicinity of the mirror angle on the basis of the mirror-model, calculates a relative overlap degree of the beams in the retiming positions in the vicinity of the mirror angle on the basis of the emission directions of the light emitted from the light source and the extent degrees of the beams, and obtains, on the basis of the overlap degree, a beam overlap correction amount for reducing brightness in a part that becomes bright due to high density of output points of light in each brightness distortion correction table calculation position.

(20)

The image processing device according to (19), wherein the brightness distortion correction table calculation unit normalizes the extent degree of the beams in each of the retiming positions in a periphery of the brightness distortion table calculation position in a manner that the beams have Gaussian distribution of σ=1 and then overlaps the beams to calculate the overlap degree, performs normalization in a manner that a maximum overlap rate becomes 1 to obtain an overlap rate of the beams, and obtains a beam overlap brightness distortion correction amount corresponding to an overlap rate p2 in a predetermined distance d from a beam center.

(21)

An image processing method including:

a parameter input step of inputting a projection unit configured to project an input image on an object and a parameter regarding the input image;

a shape distortion correction table calculation step of calculating, on the basis of the parameter, a shape distortion correction table for correcting shape distortion included in a projection image on the projection object from the projection unit; and a brightness distortion correction table calculation step of calculating, on the basis of the parameter, a brightness distortion correction table for correcting brightness distortion included in the projection image.

(22)

A computer program described in computer-readable consciousness, the computer program causing a computer to function as:

a projection unit configured to project an input image on an object and a parameter input unit configured to input a parameter regarding the input image;

a shape distortion correction table calculation unit configured to calculate, on the basis of the parameter, a shape distortion correction table for correcting shape distortion included in a projection image on the projection object from the projection unit; and a brightness distortion correction table calculation unit configured to calculate, on the basis of the parameter, a brightness distortion correction table for correcting brightness distortion included in the projection image.

REFERENCE SIGNS LIST 100 projection-type image display device
101 projection unit
102 image processing unit
103 image input unit
104 correction table calculation unit
201 light source
202 condensing lens
203 horizontal mirror
204 vertical mirror
205 control unit
206 screen
213 horizontal mirror axis
214 vertical mirror axis
223 horizontal mirror rotation driving unit
224 vertical mirror rotation driving unit
205 control unit
301 image writing/reading control unit
302 frame memory
303 image correction unit
304 image quality adjustment unit

The invention claimed is:

1. A projection-type image display device, comprising:
a projection unit including a light source configured to emit light that has intensity corresponding to a pixel value of an input image and a deflection unit configured to deflect the emitted light from the light source based on a mirror that scans a projection object;
a retiming unit configured to execute a retiming operation on pixel data of the input image based on a deflection angle in the deflection unit;

a shape distortion correction table which comprises of a shape distortion correction amount in each shape distortion correction table calculation position, wherein the shape distortion correction table is required for correction of shape distortion included in a projection image on the projection object from the projection unit;

a brightness distortion correction table which comprises of a brightness distortion correction amount in each brightness distortion correction table calculation position, wherein the brightness distortion correction table is required for correction of brightness distortion included in the projection image;

an image correction unit configured to correct distortion of the input image based on a signal processing operation on the shape distortion correction table and the brightness distortion correction table; and a correction table calculation unit configured to calculate at least one of the shape distortion correction amount in each shape distortion correction table calculation position or the brightness distortion correction amount in each brightness distortion correction table calculation position based on an input image parameter including at least one of a size of the input image, a mirror-parameter including a deflection angle of the mirror of a polarization unit, an effective beam region information, a mirror angle information at a time of the retiming operation, a mirror-model including a position of the mirror and an optical arrangement information of the mirror and the light source, or a projection object parameter including a position information of the projection object relative to the projection unit.

2. The projection-type image display device according to claim 1,
wherein the correction table calculation unit is further configured to:
generate the mirror angle information corresponding to an outer circumference portion of the input image based on the input image parameter and the mirror-parameter,
execute a ray tracing operation on an emission direction of the light emitted from the light source in the outer circumference portion of the input image based on the mirror-model,
calculate a region on the projection object, the region corresponding to the outer circumference portion of the input image, based on the projection object parameter, and
calculate a standard image position including a region that is inscribed with the region corresponding to the outer circumference portion and has a same aspect ratio as the input image, and
generate the mirror angle information corresponding to each shape distortion correction table calculation position based on the input image parameter and the mirror-parameter,
execute the ray tracing operation on the emission direction of the light emitted from the light source in each shape distortion correction table calculation position based on the mirror-model,
calculate a position on the projection object, the position corresponding to each shape distortion correction table calculation position, based on the projection object parameter, and normalize the position on the projection object, and
the position corresponding to each shape distortion correction table calculation position, based on the standard image position to obtain the shape distortion correction amount in each shape distortion correction table calculation position.

3. The projection-type image display device according to claim 1,
wherein the correction table calculation unit is further configured to calculate the brightness distortion correction table to correct beam diffusion brightness distortion caused by a difference of beam diffusion of the emitted light in each place in a drawing effective region of the projection object and beam overlap brightness distortion caused by an overlap degree of beams of the emitted light in each place in the drawing effective region of the projection object.

4. The projection-type image display device according to claim 3,
wherein the correction table calculation unit is further configured to calculate the brightness distortion correction table to correct the beam diffusion brightness distortion and the beam overlap brightness distortion based on at least one of the input image parameter including the size of the input image, the mirror-parameter including the deflection angle of the mirror of the polarization unit, the effective beam region information, the mirror angle information at the time of the retiming operation, the mirror-model including the position of the mirror and the optical arrangement information of the mirror and the light source, or the projection object parameter including the position information of the projection object relative to the projection unit.

5. The projection-type image display device according to claim 3,
wherein the correction table calculation unit is further configured to multiply together the beam diffusion brightness distortion and the beam overlap brightness distortion obtained in each brightness distortion correction table calculation position to normalize a multiplied distortion and set the multiplied distortion as the brightness distortion correction amount in the position.

6. The projection-type image display device according to claim 4,
wherein the correction table calculation unit is further configured to:
generate the mirror angle information corresponding to each brightness distortion correction table calculation position based on the input image parameter and the mirror-parameter,
execute a ray tracing operation on an emission direction of the light emitted from the light source and an extent of beams in each brightness distortion correction table position based on the mirror-model,
calculate a position and the extent of the beams on the projection object, the position and the extent of the beams corresponding to each brightness distortion correction table calculation position, based on the projection object parameter,
calculate an extent degree of the beams in each brightness distortion correction table calculation position based on the extent of the beams, and
calculate a beam diffusion brightness distortion correction amount to reduce beam brightness in each brightness distortion correction table calculation position based on the extent degree of the beams.

7. The projection-type image display device according to claim 6,
wherein the correction table calculation unit is further configured to calculate the beam diffusion brightness distortion correction amount based on calculation of the extent degree of the beams in each brightness distortion correction table calculation position as an area s of a 3σ region on the projection object and normalization of the area s based on a determined extent degree $S_{max}$.

8. The projection-type image display device according to claim 4,
wherein the correction table calculation unit is further configured to:
calculate mirror angles in retiming positions in a vicinity of a mirror angle corresponding to each brightness distortion correction table calculation position based on the mirror-parameter,
execute a ray tracing operation on emission directions of light emitted from the light source and extent degrees of beams corresponding to the mirror angles in the retiming positions in the vicinity of the mirror angle based on the mirror-model,
calculate a relative overlap degree of the beams in the retiming positions in the vicinity of the mirror angle based on the emission directions of the light emitted from the light source and the extent degrees of the beams, and
obtain, based on the overlap degree, a beam overlap correction amount to reduce brightness in a part that becomes bright due to high density of output points of light in each brightness distortion correction table calculation position.

9. The projection-type image display device according to claim 8,
wherein the correction table calculation unit is further configured to:
normalize the extent degree of the beams in each of the retiming positions in a periphery of the brightness distortion correction table calculation position in a manner that the beams have Gaussian distribution of σ=1 and overlap the beams to calculate the overlap degree,
normalize in a manner that a maximum overlap rate becomes 1 to obtain an overlap rate of the beams, and
obtain a beam overlap brightness distortion correction amount corresponding to an overlap rate p2 in a determined distance d from a beam center.

10. An image processing device, comprising:
a projection unit configured to project an input image on an object and a parameter input unit configured to input a parameter regarding the input image;
a shape distortion correction table calculation unit configured to calculate, based on the parameter, a shape distortion correction table to correct shape distortion included in a projection image on the projection object from the projection unit;
a brightness distortion correction table calculation unit configured to calculate, based on the parameter, a brightness distortion correction table to correct brightness distortion included in the projection image; and
a correction table calculation unit configured to calculate at least one of a shape distortion correction amount in each shape distortion correction table calculation position or a brightness distortion correction amount in each brightness distortion correction table calculation position based on an input image parameter including at least one of a size of the input image, a mirror-parameter including a deflection angle of a mirror of a polarization unit, an effective beam region information, a mirror angle information at a time of a retiming operation, a mirror-model including a position of the mirror and an optical arrangement information of the mirror and a light source included in the projection unit, or a projection object parameter including a position information of the projection object relative to the projection unit.

11. The image processing device according to claim 10,
wherein the light source is configured to emit light which has intensity corresponding to a pixel value of the input image and a deflection unit configured to deflect the emitted light from the light source based on the mirror that scans a projection object, and
execute the retiming operation on pixel data of the input image based on a deflection angle in the deflection unit for irradiation.

12. The image processing device according to claim 11,
wherein the shape distortion correction table calculation unit is further configured to:
generate the mirror angle information corresponding to an outer circumference portion of the input image based on the input image parameter and the mirror-parameter,
execute a ray tracing operation on an emission direction of the light emitted from the light source in the outer circumference portion of the input image based on the mirror-model,
calculate a region on the projection object, the region corresponding to the outer circumference portion of the input image, based on the projection object parameter, and
calculate a standard image position including a region that is inscribed with the region corresponding to the outer circumference portion and has a same aspect ratio as the input image,
generate the mirror angle information corresponding to each shape distortion correction table calculation position of the shape distortion correction table based on the input image parameter and the mirror-parameter,
execute the ray tracing operation on the emission direction of the light emitted from the light source in each shape distortion correction table calculation position based on the mirror-model, and
calculate a position on the projection object, the position corresponding to each shape distortion correction table calculation position, based on the projection object parameter, and
normalize the position on the projection object, the position corresponding to each shape distortion correction table calculation position, based on the standard image position to obtain the shape distortion correction amount in each shape distortion correction table calculation position.

13. The image processing device according to claim 11,
wherein the brightness distortion correction table calculation unit is further configured to calculate the brightness distortion correction table to correct beam diffusion brightness distortion caused by a difference of beam diffusion of the emitted light in each place in a drawing effective region of the projection object and beam overlap brightness distortion caused by an overlap degree of beams of the emitted light in each place in the drawing effective region of the projection object.

14. The image processing device according to claim 13,
wherein the brightness distortion correction table calculation unit is further configured to multiply together the beam diffusion brightness distortion and the beam overlap brightness distortion obtained in each brightness distortion correction table calculation position to normalize a multiplied distortion and set the multiplied distortion as a brightness distortion correction amount in the position.

15. The image processing device according to claim 13, wherein the brightness distortion correction table calculation unit is further configured to:

generate the mirror angle information corresponding to each brightness distortion correction table calculation position based on the input image parameter and the mirror-parameter, execute a ray tracing operation on an emission direction of the light emitted from the light source and an extent of beams in each brightness distortion correction table position based on the mirror-model, calculate a position and the extent of the beams on the projection object, the position and the extent of the beams corresponding to each brightness distortion correction table calculation position, based on the projection object parameter, calculate an extent degree of the beams in each brightness distortion correction table calculation position based on the extent of the beams, and calculate a beam diffusion brightness distortion correction amount to reduce beam brightness in each brightness distortion correction table calculation position based on the extent degree of the beams.

16. The image processing device according to claim 13, wherein the brightness distortion correction table calculation unit is further configured to:

calculate mirror angles in retiming positions in a vicinity of a mirror angle corresponding to each brightness distortion correction table calculation position based on the mirror-parameter, execute a ray tracing operation on emission directions of light emitted from the light source and extent degrees of beams corresponding to the mirror angles in the retiming positions in the vicinity of the mirror angle based on the mirror-model, calculate a relative overlap degree of the beams in the retiming positions in the vicinity of the mirror angle based on the emission directions of the light emitted from the light source and the extent degrees of the beams, and obtain, based on the overlap degree, a beam overlap correction amount to reduce brightness in a part that becomes bright due to high density of output points of light in each brightness distortion correction table calculation position.

17. An image processing method, comprising:

projecting an input image on an object and inputting a parameter regarding the input image;

calculating, based on the parameter, a shape distortion correction table for correcting shape distortion included in a projection image on the projection object from the projection unit;

calculating, based on the parameter, a brightness distortion correction table for correcting brightness distortion included in the projection image; and calculating at least one of a shape distortion correction amount in each shape distortion correction table calculation position or a brightness distortion correction amount in each brightness distortion correction table calculation position based on an input image parameter including at least one of a size of the input image, a mirror-parameter including a deflection angle of a mirror of a polarization unit, an effective beam region information, a mirror angle information at a time of a retiming operation, a mirror-model including a position of the mirror and an optical arrangement information of the mirror and a light source included in the projection unit, or a projection object parameter including a position information of the projection object relative to the projection unit.

18. A non-transitory computer-readable medium storing computer-readable instructions thereon, which when executed by a computer, cause the computer to execute operations, the operations comprising:

projecting an input image on an object and inputting a parameter regarding the input image;

calculating, based on the parameter, a shape distortion correction table for correcting shape distortion included in a projection image on the projection object;

calculating, based on the parameter, a brightness distortion correction table for correcting brightness distortion included in the projection image; and calculating at least one of a shape distortion correction amount in each shape distortion correction table calculation position or a brightness distortion correction amount in each brightness distortion correction table calculation position based on an input image parameter including at least one of a size of the input image, a mirror-parameter including a deflection angle of a mirror of a polarization unit, an effective beam region information, a mirror angle information at a time of a retiming operation, a mirror-model including a position of the mirror and an optical arrangement information of the mirror and a light source included in the projection unit, or a projection object parameter including a position information of the projection object relative to the projection unit.

* * * * *